US012576452B2

(12) United States Patent
Sato et al.

(10) Patent No.: US 12,576,452 B2
(45) Date of Patent: Mar. 17, 2026

(54) DRILL

(71) Applicant: MITSUBISHI MATERIALS CORPORATION, Tokyo (JP)

(72) Inventors: Akira Sato, Tokyo (JP); Katsuhiro Nagasawa, Tokyo (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 529 days.

(21) Appl. No.: 18/017,169

(22) PCT Filed: Jul. 27, 2021

(86) PCT No.: PCT/JP2021/027619
§ 371 (c)(1),
(2) Date: Jan. 20, 2023

(87) PCT Pub. No.: WO2022/025015
PCT Pub. Date: Feb. 3, 2022

(65) Prior Publication Data
US 2023/0256524 A1 Aug. 17, 2023

(30) Foreign Application Priority Data

Jul. 27, 2020 (JP) ................................. 2020-126514
Jul. 26, 2021 (JP) ................................. 2021-121845

(51) Int. Cl.
*B23B 51/02* (2006.01)
(52) U.S. Cl.
CPC ........ *B23B 51/02* (2013.01); *B23B 2251/043* (2013.01); *B23B 2251/08* (2013.01); *B23B 2251/40* (2013.01)
(58) Field of Classification Search
CPC .............. B23B 51/02; B23B 2251/043; B23B 2251/08; B23B 2251/40; B23B 2251/085;
(Continued)

(56) References Cited

U.S. PATENT DOCUMENTS 5,350,261 A * 9/1994 Takaya .................... B23B 51/02
408/229
11,819,926 B2 * 11/2023 Shitrit ..................... B23B 27/16
(Continued)

FOREIGN PATENT DOCUMENTS

CN 105473262 A 4/2016
CN 110842259 A 2/2020
(Continued)

OTHER PUBLICATIONS

Office Action mailed Apr. 25, 2025, issued for JP2021-121845 and English translation thereof.
(Continued)

*Primary Examiner* — Robert F Long
(74) *Attorney, Agent, or Firm* — Troutman Pepper Locke LLP

(57) ABSTRACT

A chip discharging flute is formed in a tip outer peripheral portion of a drill body rotated around an axis in a drill rotation direction. A cutting edge is formed in an intersection ridgeline portion between a wall surface of the chip discharging flute facing the drill rotation direction and a tip flank. The cutting edge includes a main cutting edge portion extending from an inner peripheral side toward an outer peripheral side of the drill body, and a cutting edge shoulder portion extending from an outer peripheral end of the main cutting edge portion to an outer periphery of the drill body, and is subjected to honing. Compared to the outer peripheral end of the main cutting edge portion, in an outer peripheral end of the cutting edge shoulder portion, a true rake angle is increased on a negative rake angle side, and a size of the honing decreases.

8 Claims, 27 Drawing Sheets

(58) Field of Classification Search
CPC ........ B23B 2251/122; B23B 2251/125; B23B
2251/14
USPC ............. 408/1, 8–15, 67, 76, 145, 230, 224
See application file for complete search history.

(56) References Cited

U.S. PATENT DOCUMENTS

| | | | | |
|---|---|---|---|---|
| 11,951,553 | B2 * | 4/2024 | Shitrit ..................... | B23B 51/02 |
| 12,109,635 | B2 * | 10/2024 | Shitrit ................. | B23B 51/0003 |
| 2009/0087275 | A1 * | 4/2009 | Goulbourne ............ | B23B 51/02 |
| | | | | 408/230 |
| 2009/0214309 | A1 * | 8/2009 | Rees ........................ | B23B 51/10 |
| | | | | 408/229 |
| 2013/0189044 | A1 * | 7/2013 | Durfee .................... | B23B 51/02 |
| | | | | 408/214 |
| 2015/0266106 | A1 * | 9/2015 | Bozkurt ................ | B23B 51/009 |
| | | | | 408/57 |
| 2015/0283624 | A1 * | 10/2015 | Jindai ..................... | B23B 51/06 |
| | | | | 408/230 |
| 2017/0066062 | A1 | 3/2017 | Takahashi et al. | |
| 2017/0274461 | A1 * | 9/2017 | Mabuchi ................. | B23B 51/02 |
| 2020/0108449 | A1 | 4/2020 | Brodski et al. | |
| 2020/0156163 | A1 * | 5/2020 | Bohn ...................... | B23B 51/06 |
| 2021/0154749 | A1 * | 5/2021 | Parendo ................. | B23B 51/02 |
| 2021/0291282 | A1 * | 9/2021 | Jindai ..................... | B23B 51/02 |
| 2023/0173594 | A1 * | 6/2023 | Ogawa .................... | B23B 51/02 |
| | | | | 408/1 R |

FOREIGN PATENT DOCUMENTS

| | | | | | |
|---|---|---|---|---|---|
| DE | 20211592 | U1 * | 5/2004 | .......... | B23B 51/009 |
| EP | 0320881 | A2 * | 6/1989 | ............ | B23B 51/02 |
| JP | 63251129 | A * | 10/1988 | | |
| JP | S63-251129 | A | 10/1988 | | |
| JP | 2001-096416 | A | 4/2001 | | |
| JP | 2003-025127 | A | 1/2003 | | |
| JP | 2003-225816 | A | 8/2003 | | |
| JP | 2003-300109 | A | 10/2003 | | |
| JP | 2005-305611 | A | 11/2005 | | |
| JP | 2006055965 | A * | 3/2006 | ............ | B23B 51/02 |
| JP | 2010115750 | A * | 5/2010 | | |
| JP | 2012-035359 | | 2/2012 | | |
| JP | 2014-008549 | A | 1/2014 | | |
| JP | 2017-124475 | A | 7/2017 | | |
| JP | 2019171493 | A * | 10/2019 | | |
| JP | 2019-209439 | A | 12/2019 | | |
| JP | 2022-502267 | A | 1/2022 | | |
| JP | 2022023828 | A * | 2/2022 | | |
| JP | 2023068305 | A * | 5/2023 | | |
| WO | 2020/054702 | A1 | 3/2020 | | |
| WO | WO-2024176439 | A1 * | 8/2024 | ............ | B23B 51/00 |

OTHER PUBLICATIONS

International Search Report mailed Sep. 28, 2021, issued for PCT/JP2021/027619 and English translation thereof.
Supplementary European Search Report mailed Jul. 18, 2024, issued for EP21850381.1.
Office Action mailed Jan. 24, 2025, issued for CN202180060487.0 and English translation of the Search Report.
Notice of Allowance mailed Aug. 26, 2025, issued for JP2021-121845 and English translation thereof.

\* cited by examiner

DRILL

TECHNICAL FIELD

The present invention relates to a drill in which a tip outer peripheral portion of a drill body rotated around an axis in a drill rotation direction has a chip discharging flute which is open in a tip flank of the drill body and extends to a rear end side in a direction of the axis, and an intersection ridgeline portion between a wall surface of the chip discharging flute facing the drill rotation direction and the tip flank has a cutting edge having the wall surface as a rake face.

Priority is claimed on Japanese Patent Application No. 2020-126514, filed on Jul. 27, 2020 and Japanese Patent Application No. 2021-121845, filed on Jul. 26, 2021, the contents of which are incorporated herein by reference.

BACKGROUND ART

As this drill, for example, Patent Document 1 discloses a drill as follows. A chip discharging flute extending toward a rear end side is formed on an outer periphery of a cutting edge portion which is a tip side portion of a drill body rotated around an axis, and a cutting edge is formed in an intersection ridgeline portion between a rake face in a tip side region of an inner wall surface facing forward in a drill rotation direction and a tip flank of the cutting edge portion.

The drill disclosed in Patent Document 1 has a margin portion intersecting with the rake face and facing an outer peripheral side, a shoulder portion serving as the intersection ridgeline portion between the margin portion and the tip flank of the cutting edge portion and extending rearward in the drill rotation direction from an outer peripheral end of a cutting edge, and a thinning portion extending toward a tip side of an inner wall surface of the chip discharging flute.

In addition, in order from a rotation center, the cutting edge has a first cutting edge portion formed in the thinning portion, a second cutting edge portion formed on an outer peripheral side further from the first cutting edge portion, a shoulder cutting edge portion formed in the shoulder portion, and a margin cutting edge portion formed in the margin portion. The second cutting edge portion, the margin cutting edge portion, and the shoulder cutting edge portion are subjected to honing.

In the drill disclosed in Patent Document 1, a honing width of the respective portions satisfy a relationship expressed by Formula (1) below.

Honing width of shoulder cutting edge
portion>Honing width of margin cutting edge
portion≧Honing width of second cutting edge
portion     (1)

CITATION LIST

Patent Document

[Patent Document 1]
Japanese Unexamined Patent Application, First Publication No. 2019-209439

SUMMARY OF INVENTION

Technical Problem

In this way, in the drill disclosed in Patent Document 1, the honing width of the shoulder cutting edge portion is largest, compared to the honing width of the margin cutting edge portion and the honing width of the second cutting edge portion. However, in the drill in which the honing width of the shoulder portion of the cutting edge is maximized in this way, damage inside a honing region of a cutting edge shoulder portion is likely to progress. Therefore, welding is likely to occur. When a welded object welded in this way is detached, there is a possibility that the cutting edge shoulder portion may be suddenly defective and a drill life may be shortened.

Furthermore, in the drill in which the honing width of the cutting edge shoulder portion is increased in this way, cutting resistance in the cutting edge shoulder portion increases. For example, when a through-hole is drilled, there is a possibility that a large burr may appear in penetrating the through-hole.

The present invention is made under this background, and an object thereof is to provide a drill which can prevent a defect of a cutting edge shoulder portion by preventing occurrence of welding and can suppress a burr in penetrating a through-hole while ensuring cutting edge strength in the cutting edge shoulder portion of a cutting edge outer periphery.

Solution to Problem

According to the present invention, in order to solve the above-described problems, there is provided a drill in which a tip outer peripheral portion of a drill body rotated around an axis in a drill rotation direction has a chip discharging flute which is open in a tip flank of the drill body and extends to a rear end side in a direction of the axis, and an intersection ridgeline portion between a wall surface of the chip discharging flute facing the drill rotation direction and the tip flank has a cutting edge having the wall surface as a rake face. The cutting edge includes a main cutting edge portion extending from an inner peripheral side toward an outer peripheral side of the drill body, and a cutting edge shoulder portion extending from an outer peripheral end of the main cutting edge portion to an outer periphery of the drill body, and is subjected to honing. Compared to the outer peripheral end of the main cutting edge portion, in an outer peripheral end of the cutting edge shoulder portion, a true rake angle which is an inclination angle of the rake face with respect to a straight line connecting the cutting edge and the axis in a cross section orthogonal to the cutting edge is increased on a negative rake angle side, and a size of the honing decreases.

In the drill configured in this way, in the outer peripheral end of the cutting edge shoulder portion on the outer peripheral side of the cutting edge, the true rake angle which is the inclination angle of the rake face with respect to the straight line connecting the cutting edge and the axis of the drill body in the cross section orthogonal to the cutting edge is increased on the negative rake angle side, compared to the true rake angle of the outer peripheral end of the main cutting edge portion. Therefore, a wedge angle of the cutting edge in the cutting edge shoulder portion can be increased, and cutting edge strength can be secured. Therefore, occurrence of welding can be prevented by preventing damage to the cutting edge shoulder portion, and when a welded object is detached, it is possible to suppress a possibility that the cutting edge shoulder portion may be suddenly defective and a drill life may be shortened.

In addition, a size of the honing applied to the cutting edge decreases in the outer peripheral end of the cutting edge shoulder portion, compared to the outer peripheral end of the main cutting edge portion. Therefore, it is possible to further prevent a possibility that welding may occur in the cutting edge shoulder portion. In addition, since the honing decreases in this way, it is possible to improve cutting quality of the cutting edge in the cutting edge shoulder portion. Therefore, it is possible to suppress a possibility that a burr may appear in penetrating a through-hole when the through-hole is drilled.

In a case of chamfer honing (angle honing) or compound honing which has a straight line portion in the cross section orthogonal to the cutting edge, the size of the honing is a width of a honing surface in a direction along the straight line connecting the cutting edge and the axis in the cross section orthogonal to the cutting edge. In addition, in a case of round honing in which the honing has a convex curved shape such as a convex arc in the cross section orthogonal to the cutting edge, the size of the honing is a radius (curvature radius) of the honing surface in the cross section orthogonal to the cutting edge.

Here, according to a first aspect, in order to increase the true rake angle in the outer peripheral end of the cutting edge shoulder portion on the negative rake angle side, compared to the true rake angle in the outer peripheral end of the main cutting edge portion, the tip flank and a chamfered portion disposed on the wall surface may be formed in an outer peripheral end portion of the cutting edge. The chamfered portion may be inclined to a side opposite to the drill rotation direction as the chamfered portion is directed from the rake face toward the intersection ridgeline portion with an outer peripheral surface of the drill body extending to a side opposite to the drill rotation direction. The cutting edge shoulder portion may be formed in the intersection ridgeline portion between the chamfered portion and the tip flank. In this case, for example, the chamfered portion with a small area having a polygonal shape (triangular shape or square shape) is formed. Accordingly, the true rake angle of the cutting edge shoulder portion can increase on the negative rake angle side, compared to the main cutting edge portion.

In addition, according to a second aspect, a belt-shaped chamfered portion intersecting at an obtuse angle with the wall surface on an inner peripheral side from the outer peripheral edge portion may be formed along the chip discharging flute in the outer peripheral edge portion of the wall surface of the chip discharging flute which faces the drill rotation direction. The cutting edge shoulder portion may be formed in the intersection ridgeline portion between the belt-shaped chamfered portion and the tip flank. In this case, when a new cutting edge is sharpened after cutting quality of the cutting edge is degraded due to wear, the true rake angle of the cutting edge shoulder portion can be increased on the negative rake angle side simply by grinding the tip flank, compared to the main cutting edge portion.

Furthermore, according to a third aspect, a planar chamfered portion intersecting at an obtuse angle with the tip flank on an inner peripheral side from the outer peripheral portion and the outer peripheral surface of the drill body extending from the rake face to a side opposite to the drill rotation direction may be formed in the outer peripheral portion of the tip flank. The cutting edge shoulder portion may be formed in the intersection ridgeline portion between the planar chamfered portion and the rake face. In addition, according to a fourth aspect, a convex curved chamfered portion coming into contact with the tip flank on an inner peripheral side from the outer peripheral portion and the outer peripheral surface of the drill body extending from the rake face to a side opposite to the drill rotation direction may be formed in the outer peripheral portion of the tip flank. The cutting edge shoulder portion may be formed in the intersection ridgeline portion between the convex curved chamfered portion and the rake face.

In these cases, the true rake angle of the cutting edge shoulder portion can be increased on the negative rake angle side without chamfering the rake face, compared to the main cutting edge portion. Therefore, it is possible to prevent a situation that chip discharge performance is affected by chamfering the rake face.

It is desirable that a width of the cutting edge shoulder portion in an extending direction of a straight line connecting the axis and the outer peripheral end of the cutting edge shoulder portion when viewed from a tip side in the direction of the axis is equal to or smaller than 0.2×D, compared to a diameter D of the cutting edge. When the width of the cutting edge shoulder portion exceeds 0.2×D of the diameter D of the cutting edge, a portion where the true rake angle is increased on the negative rake angle side is excessively lengthened, thereby causing a possibility that cutting resistance may increase.

In addition, it is desirable that a size of the honing of the cutting edge shoulder portion is equal to or smaller than 0.8×H, compared to a size H of the honing of the main cutting edge portion. When the size of the honing on the cutting edge shoulder portion exceeds 0.8×H, compared to the size H of the honing of the main cutting edge portion, cutting quality of the cutting edge shoulder portion is degraded, thereby causing a possibility that appearance of a burr may not be suppressed in penetrating a through-hole. The size of the honing of the cutting edge shoulder portion may be equal to or smaller than 0.5×H, or may be equal to or smaller than 0.3×H, compared to the honing size H of the main cutting edge portion.

Furthermore, the honing applied to the main cutting edge portion and the honing applied to the cutting edge shoulder portion of the cutting edge may be chamfer honing, compound honing, or round honing as described above. However, it is desirable that the honing applied to the main cutting edge portion is the chamfer honing, and the honing applied to the cutting edge shoulder portion is the round honing. In this manner, cutting edge strength can be sufficiently secured in the main cutting edge portion mainly used for drilling. While cutting edge strength can be maintained in the cutting edge shoulder portion, further improved cutting quality can be achieved.

Advantageous Effects of Invention

As described above, according to the present invention, the cutting edge strength can be secured by increasing the wedge angle in the cutting edge shoulder portion, and the occurrence of welding in the cutting edge shoulder portion can be prevented. Therefore, it is possible to prevent a possibility that defects may be caused by detachment of the welded object. Furthermore, according to the present invention, the cutting quality of the cutting edge shoulder portion is improved. Accordingly, it is possible to suppress a possibility that a burr may appear in penetrating the through-hole when the through-hole is drilled.

BRIEF DESCRIPTION OF DRAWINGS

FIG. 14 is a side view when viewed in the direction of the arrow X in FIG. 13 (viewed in the direction perpendicular to the straight line N1).

FIG. 25 is a side view representing the cutting edge portion of a drill in FIG. 24, and is more specifically a side view when the cutting edge portion in FIG. 24 is viewed in the direction perpendicular to the straight line N1.

DESCRIPTION OF EMBODIMENTS

Figure 1:
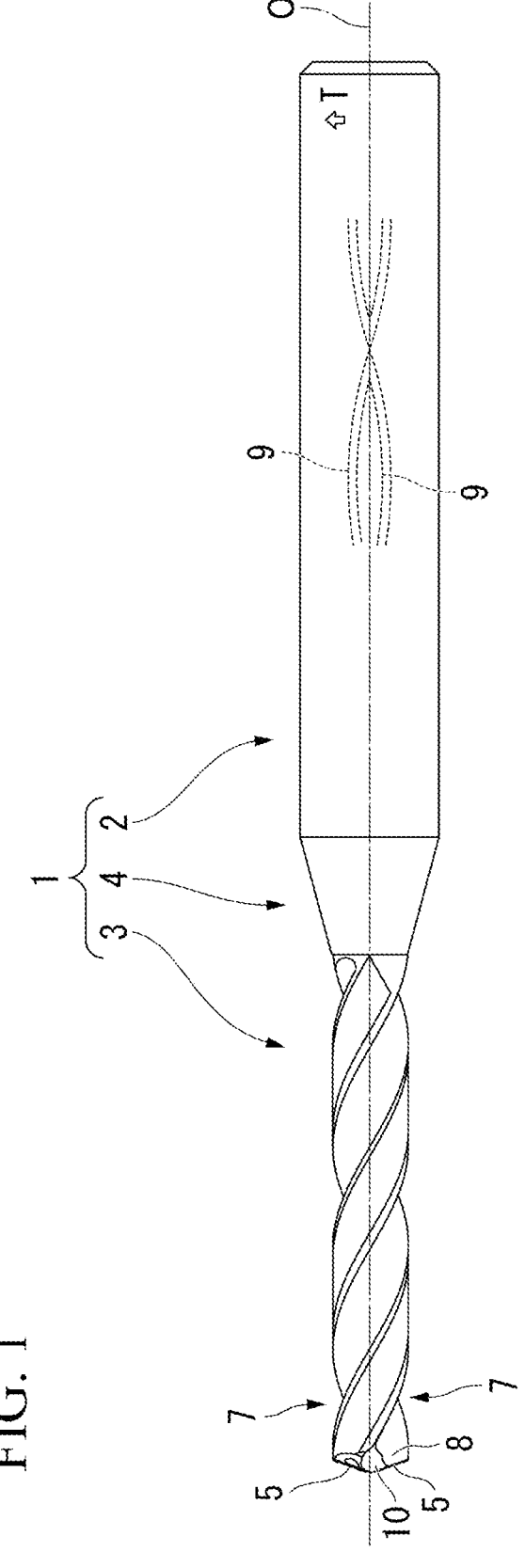
FIG. 1 is a side view representing a first embodiment of the present invention.

FIGS. 1 to 7 represent a first embodiment of the present invention. In the present embodiment, a drill body 1 is integrally formed of a hard material such as cemented carbide in a multi-stage columnar shape formed around an axis O. A large-diameter rear end portion (right-side portion in FIG. 1) of the drill body 1 serves as a shank portion 2, and a tip portion (left-side portion in FIG. 1) having a smaller diameter than the shank portion 2 serves as a cutting edge portion 3. In addition, between the shank portion 2 and the cutting edge portion 3 of the drill body 1 serves as a truncated conical tapered neck portion 4 formed around the axis O, whose diameter gradually decreases toward a tip side.

In this drill, the shank portion 2 of the drill body 1 is gripped by a main shaft of a machine tool. While being rotated around the axis O in a drill rotation direction T, the drill is delivered to a tip side in a direction of the axis O. In this manner, the drill drills a through-hole in a workpiece material by using a cutting edge 5 formed in a tip of the cutting edge portion 3.

A chip discharging flute 7 open to a tip flank 6 which is a tip surface of the drill body 1 and extending to arear end side in the direction of the axis O is formed on an outer periphery of the cutting edge portion 3. The cutting edge 5 having a tip portion of a wall surface as a rake face 8 is formed in an intersection ridgeline portion between the wall surface of the chip discharging flute 7 facing the drill rotation direction T and the tip flank 6. The cutting edge 5 extends to the rear end side toward an outer peripheral side of the drill body 1, that is, outward in a radial direction, and is provided with a point angle. A first margin 3A is formed on an outer peripheral surface of the cutting edge portion 3 connected to a side of the chip discharging flute 7 in a direction opposite to the drill rotation direction T. A second margin 3B is formed on the outer peripheral surface of the cutting edge portion 3 connected to a side of the chip discharging flute 7 in the drill rotation direction T.

In the present embodiment, two chip discharging flutes 7 are formed in the cutting edge portion 3 symmetrically with respect to the axis O, and are twisted to a side opposite to the drill rotation direction T toward the rear end side in the direction of the axis O to reach a tip of a tapered neck portion 4. Each cutting edge 5 is formed at the intersection ridgeline portion between the rake face 8 of the chip discharging flutes 7 and the tip flank 6. That is, the drill of the present embodiment is a twist drill having two blades.

In the drill body 1, two coolant holes 9 are formed symmetrically with respect to the axis O from a rear end surface of the shank portion 2 toward a tip side to be twisted with the same lead as that of the chip discharging flute 7. The coolant holes 9 are respectively open to the tip flank 6 through between the chip discharging flutes 7 in the cutting edge portion 3. A coolant such as cutting fluid and compressed air is jetted out from the coolant holes 9 during drilling. In addition, the tip flank 6 is formed by two-stage flank whose clearance angle increases toward the side opposite to the drill rotation direction T. The coolant hole 9 opens in the flank on the side opposite to the drill rotation direction T among the two-stage flank.

Furthermore, a thinning portion 10 is formed in a tip inner peripheral portion of the chip discharging flute 7 by cutting out a tip portion of the wall surface facing the side opposite to the drill rotation direction T of the chip discharging flute 7 from an inner peripheral portion of the rake face 8. In order from an inner periphery of the drill body 1, that is, the vicinity of the axis O toward the outer peripheral side, the cutting edge 5 includes a thinning cutting edge portion 5A, a main cutting edge portion 5B connected to the outer peripheral side of the thinning cutting edge portion 5A and formed in the intersection ridgeline portion between the rake face 8 and the tip flank 6, and a cutting edge shoulder portion 5C extending from an outer peripheral end P of the main cutting edge portion 5B to the outer periphery of the drill body 1 and having an outer peripheral end Q. In the present embodiment, the thinning cutting edge portion 5A is formed in the intersection ridgeline portion between the thinning portion 10 and the tip flank 6 connected to a side of the thinning portion 10 in the direction opposite to the drill rotation direction T.

In addition, the thinning cutting edge portion 5A, the main cutting edge portion 5B, and the cutting edge shoulder portion 5C are subjected to honing, and respectively have honing surfaces 5a, 5b, and 5c formed thereon. The honing may be chamfer honing (angle honing) having a straight line portion in a cross section orthogonal to the cutting edge 5, compound honing in which both ends of the straight line portion are rounded into a convex curve shape, or round honing having a convex curved shape such as a convex arc in a cross section orthogonal to the cutting edge 5. In the present embodiment, the chamfer honing is applied to the thinning cutting edge portion 5A and the main cutting edge portion 5B, and the round honing is applied to the cutting edge shoulder portion 5C.

Figure 5:
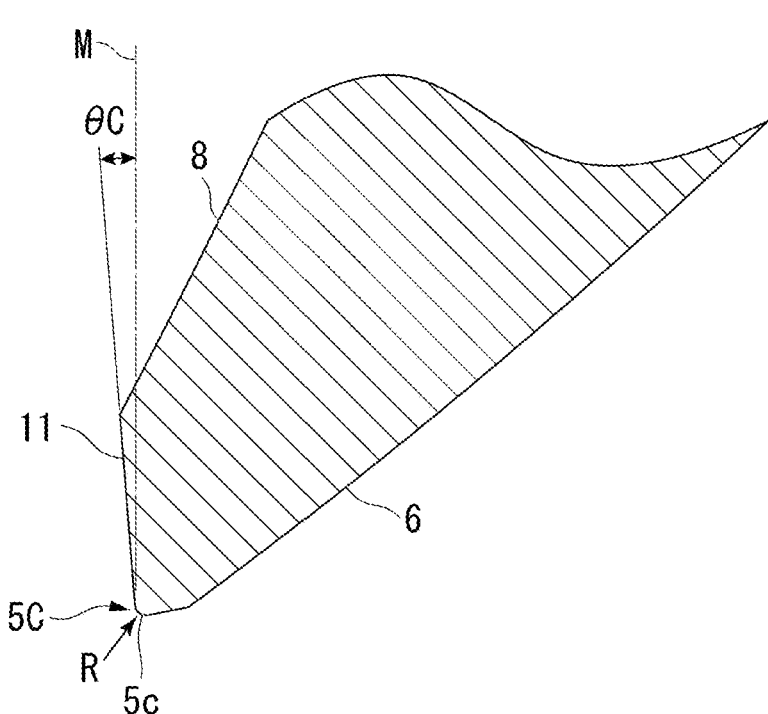
FIG. 5 is an enlarged sectional view taken along line XX in FIG. 3.
Figure 6:
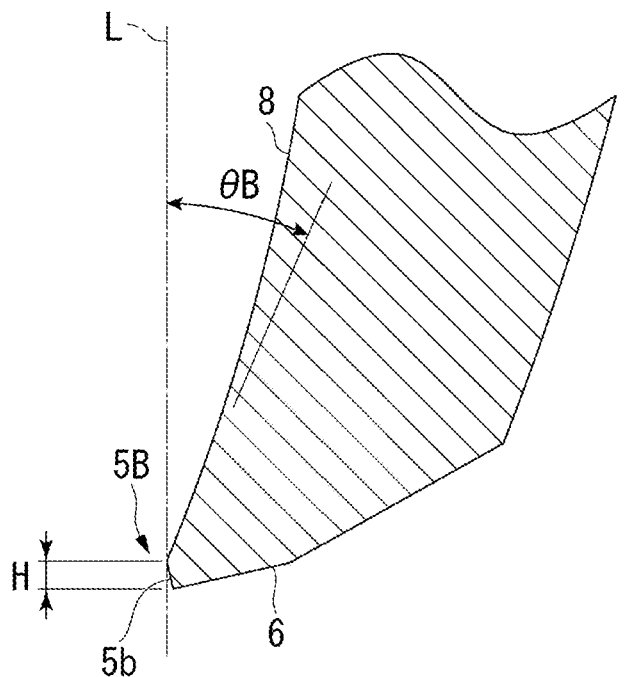
FIG. 6 is an enlarged sectional view taken along line YY in FIG. 4.
Figure 7:
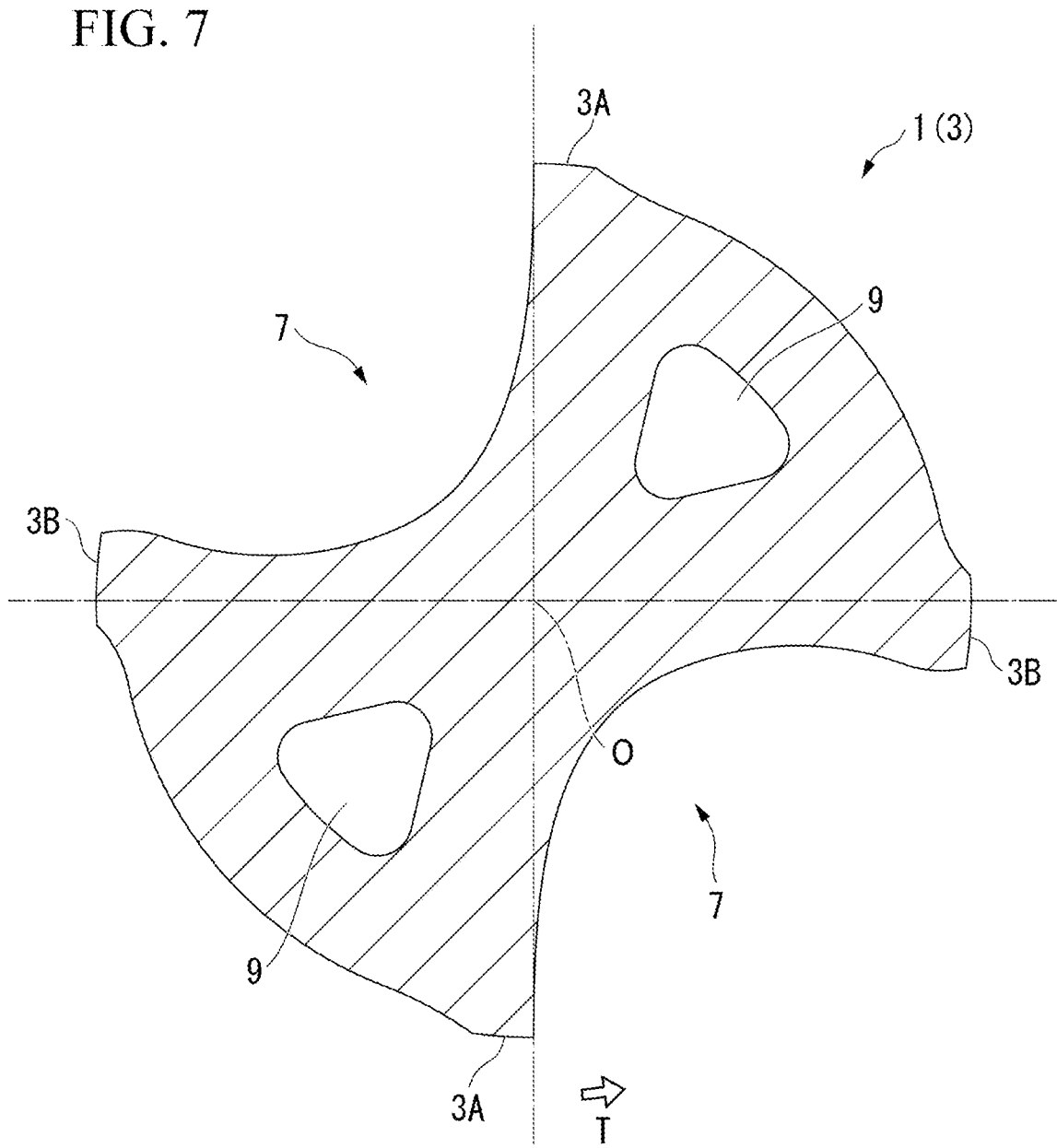
FIG. 7 is a sectional view taken along line ZZ in FIG. 3.

As represented in FIG. 6, in a cross section orthogonal to the cutting edge 5 in the outer peripheral end P of the main cutting edge portion 5B, a true rake angle θB is an inclination angle of the rake face 8 with respect to a straight line L connecting the cutting edge 5 (main cutting edge portion 5B) and the axis O. As represented in FIG. 5, in a cross section orthogonal to the cutting edge 5 in the outer peripheral end Q of the cutting edge shoulder portion 5C, a true rake angle θC is an inclination angle of the rake face with respect to a straight line M connecting the cutting edge 5 (cutting edge shoulder portion 5C) and the axis O. The true rake angle θC is increased on the negative rake angle side, compared to the true rake angle θB. In the present embodiment, as represented in FIG. 6, the true rake angle θB in the outer peripheral end P of the main cutting edge portion 5B is a positive rake angle, and as represented in FIG. 5, the true rake angle GC in an outer peripheral end Q of the cutting edge shoulder portion 5C is a negative rake angle.

Furthermore, as represented in FIG. 6, compared to a size of the honing surface 5b in the outer peripheral end P of the main cutting edge portion 5B, as represented in FIG. 5, a size of the honing surface 5c in the outer peripheral end Q of the cutting edge shoulder portion 5C is smaller.

Figure 3:
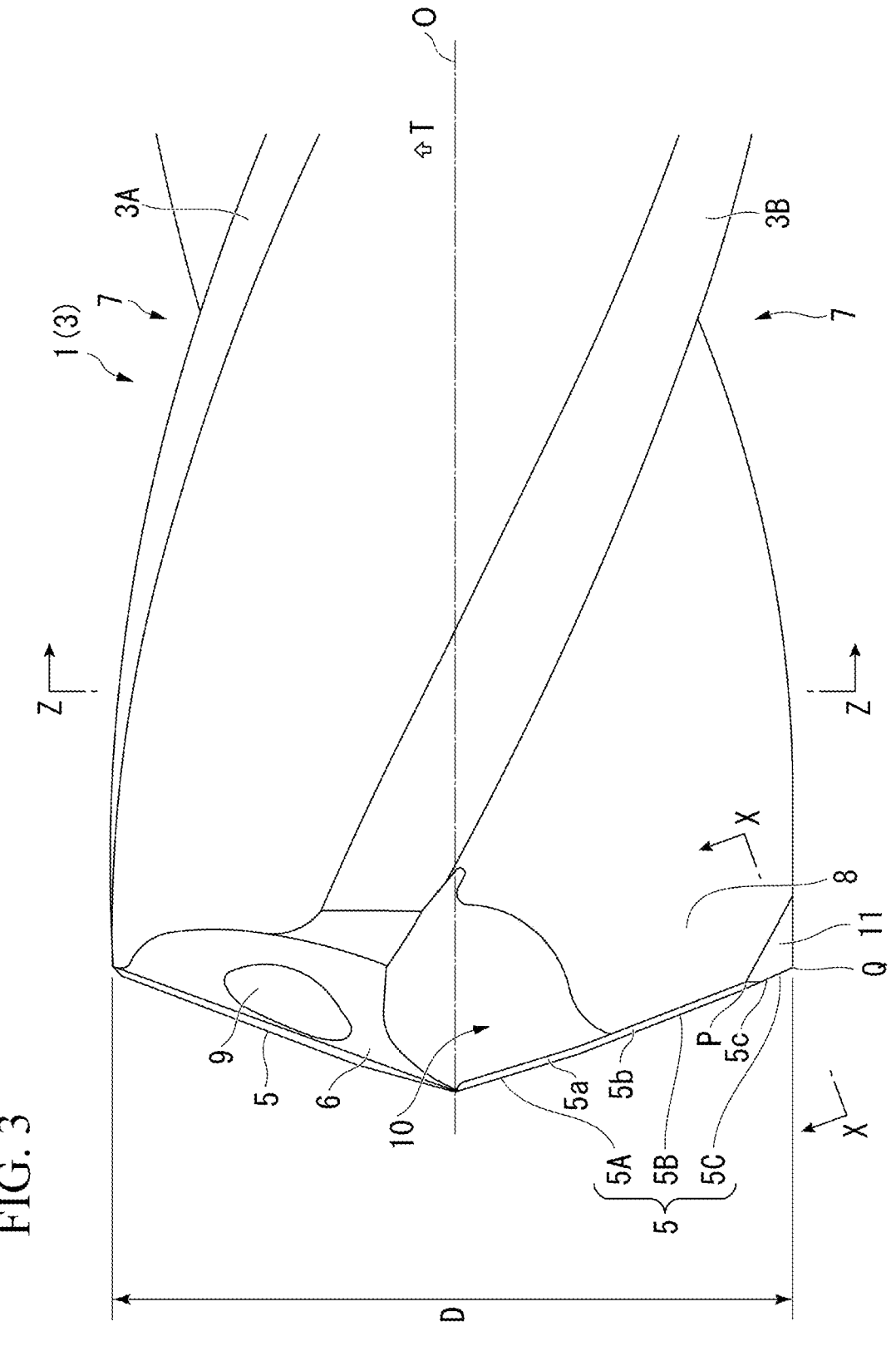
FIG. 3 is a side view when viewed in a direction of an arrow X in FIG. 2 (viewed in a direction perpendicular to a straight line N1).
Figure 4:
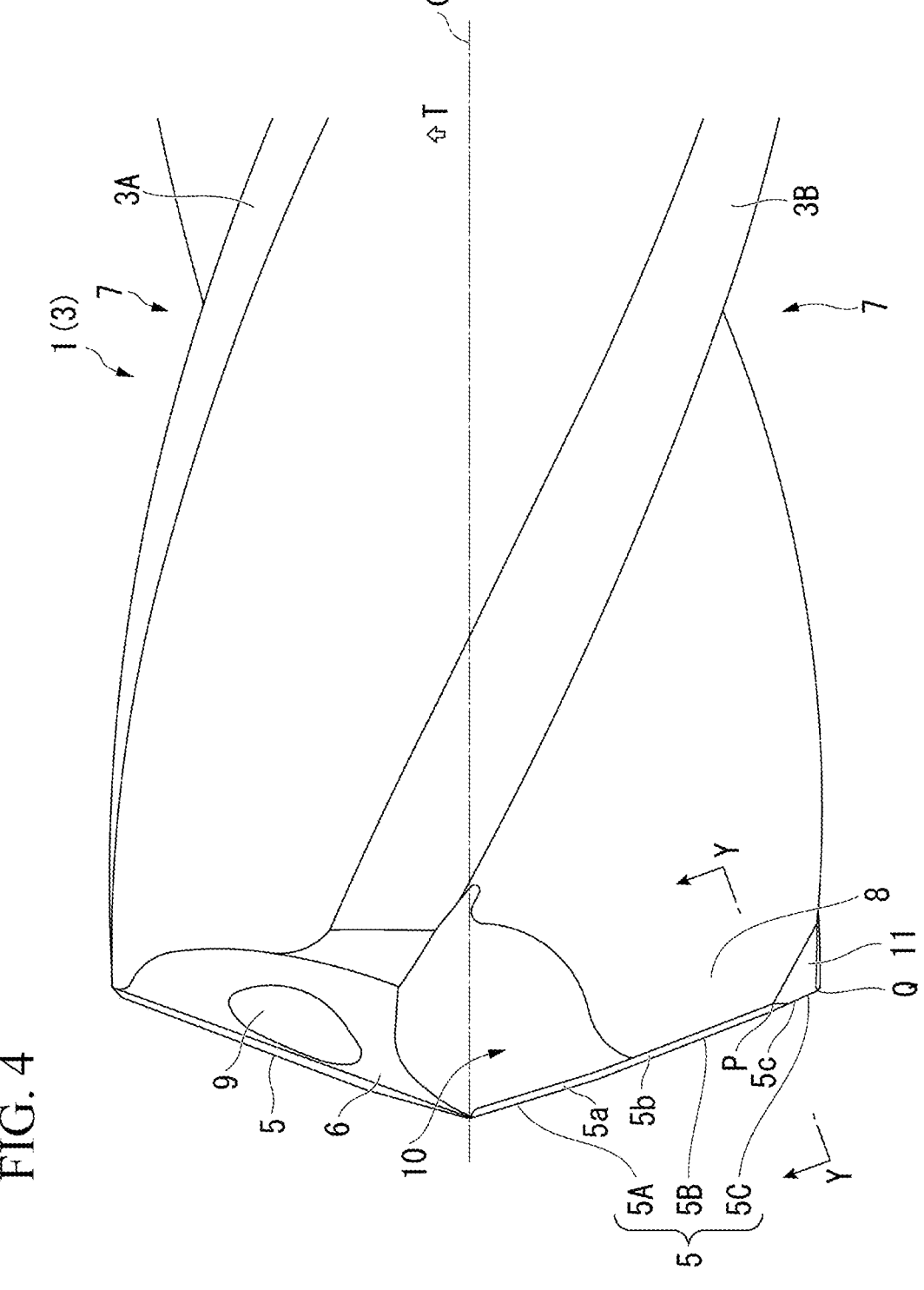
FIG. 4 is a side view when viewed in a direction of an arrow Y in FIG. 2 (viewed in a direction perpendicular to a straight line N2).

Here, in the first embodiment, as represented in FIGS. 3 and 4, the tip flank 6 and a triangular chamfered portion (chamfered portion) 11 are formed in the outer peripheral end portion of the cutting edge 5. The triangular chamfered portion 11 is disposed in a tip outer peripheral portion of the wall surface of the chip discharging flute 7 which faces the drill rotation direction T. The triangular chamfered portion 11 has a width dimension (dimension in a radial direction orthogonal to the axis O) which is narrowed as the triangular chamfered portion 11 is separated to the rear end side in the direction of the axis O from the intersection ridgeline portion (cutting edge shoulder portion 5C) with the tip flank 6. The triangular chamfered portion 11 is inclined to the side opposite to the drill rotation direction T from the rake face 8 toward the intersection ridgeline portion (leading edge) with the outer peripheral surface (first margin 3A) of the drill body 1. That is, the triangular chamfered portion 11 is inclined toward the side opposite to the drill rotation direction T as the triangular chamfered portion 11 is directed outward in the radial direction. In addition, in the present embodiment, the triangular chamfered portion 11 is inclined toward the side opposite to the drill rotation direction T as the triangular chamfered portion 11 is directed toward the tip side in the direction of the axis O. The cutting edge shoulder portion 5C is formed in the intersection ridgeline portion between the triangular chamfered portion 11 and the tip flank 6. In this manner, the true rake angle θC of the cutting edge shoulder portion 5C is increased on the negative rake angle side, compared to the true rake angle θB of the main cutting edge portion 5B.

In addition, the size of the honing surface 5b of the main cutting edge portion 5B which is the chamfer honing in the present embodiment is a width H of the honing surface 5b in the direction of the straight line L in the cross section orthogonal to the cutting edge 5 as represented in FIG. 6, in the outer peripheral end P of the main cutting edge portion 5B. In contrast, the size of the honing of the cutting edge shoulder portion 5C which is the round honing in the present embodiment is a radius (curvature radius) R of the honing surface 5c in the cross section orthogonal to the cutting edge 5 as represented in FIG. 5, in the outer peripheral end Q of the cutting edge shoulder portion 5C.

Furthermore, the size of the honing of the cutting edge shoulder portion 5C (radius R of the honing surface 5c) is equal to or smaller than 0.8×H, compared to the size of the honing of the main cutting edge portion 5B (width H of the honing surface 5b).

Figure 2:
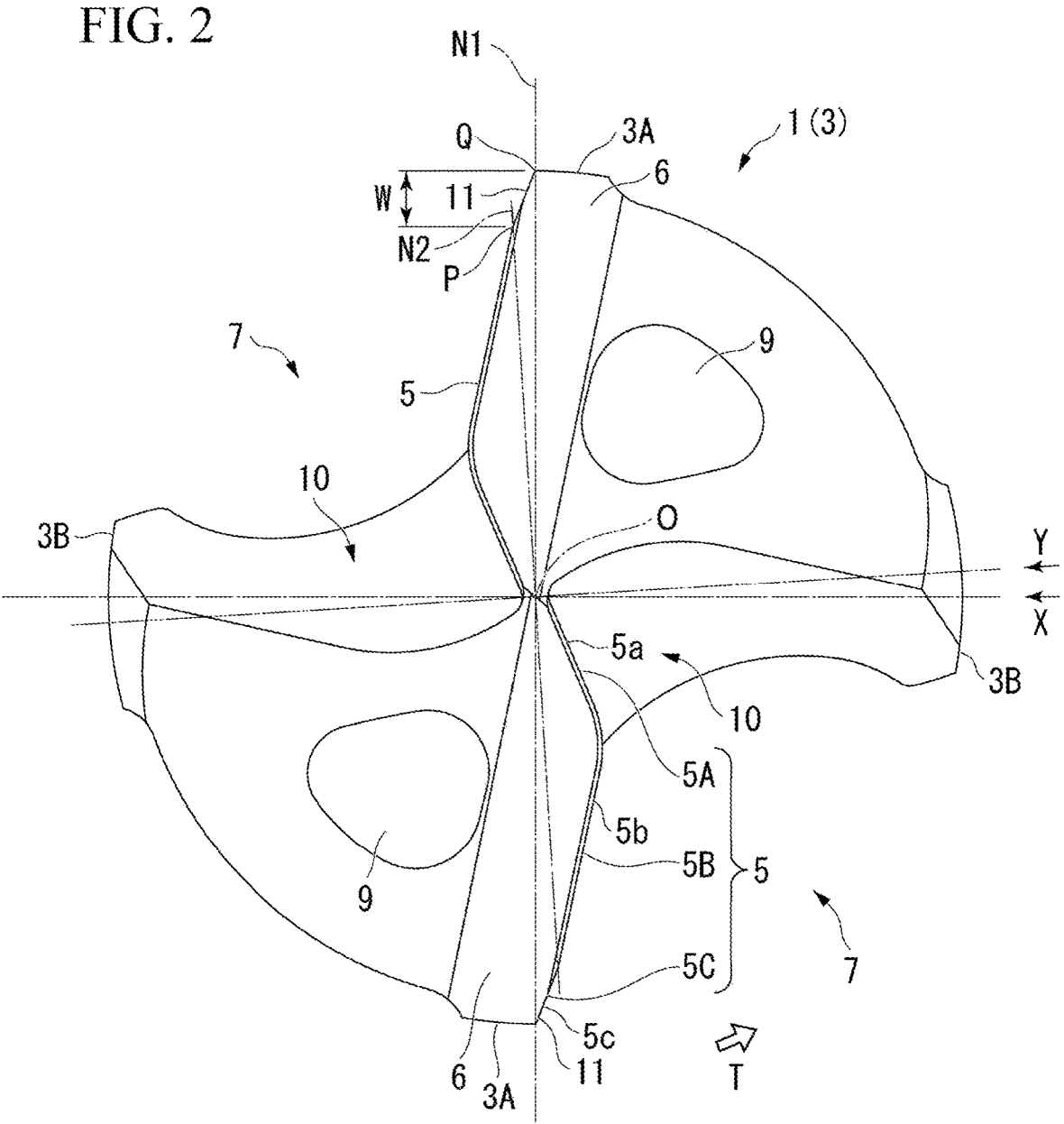
FIG. 2 is an enlarged front view of a cutting edge portion of the embodiment represented in FIG. 1.

Furthermore, as represented in FIG. 2, when the drill body 1 is viewed from the tip side in the direction of the axis O, the width W of the cutting edge shoulder portion 5C in an extending direction of a straight line N1 connecting the axis O and the outer peripheral end Q of the cutting edge shoulder portion 5C is equal to or smaller than 0.2×D, compared to the diameter D of the cutting edge 5 represented in FIG. 3 (diameter of a rotation trajectory circle formed around the axis O by the outer peripheral end Q of the cutting edge shoulder portion 5C).

In the present embodiment, when viewed from the tip side in the direction of the axis O as represented in FIG. 2, the thinning cutting edge portion 5A extends in a straight line shape from the vicinity of the axis O to the outer peripheral side, thereafter, is bent in a convex curve shape, and is connected to the main cutting edge portion 5B. In addition, the main cutting edge portion 5B extends in a straight line shape when viewed from the tip side in the direction of the axis O as similarly represented in FIG. 2.

Furthermore, the cutting edge shoulder portion 5C is formed in the triangular chamfered portion 11 as described above. In this manner, when viewed from the tip side in the direction of the axis O as represented in FIG. 2, the cutting edge shoulder portion 5C is bent to a side opposite to the drill rotation direction T with respect to the main cutting edge portion 5B in the outer peripheral end P of the main cutting edge portion 5B, and extends in a straight line shape. Thereafter, the cutting edge shoulder portion 5C is formed to reach the outer peripheral end Q.

In the drill configured in this way, the true rake angle θC in the outer peripheral end Q of the cutting edge shoulder portion 5C on the outer peripheral side of the cutting edge 5 is larger on the negative rake angle side than the true rake angle θB in the outer peripheral end P of the main cutting edge portion 5B. Therefore, as represented in FIGS. 5 and 6, it is possible to increase the wedge angle of the cutting edge 5 in the cutting edge shoulder portion 5C.

Therefore, the cutting edge strength in the cutting edge shoulder portion 5C can be secured, and damage to the cutting edge shoulder portion 5C can be prevented. In addition, a possibility that the cutting edge shoulder portion 5C may be defective when a welded object is detached can be prevented by preventing occurrence of welding caused by the damage, and an extended drill life can be achieved.

In addition, with regard to a size of the honing applied to the cutting edge 5, a size (radius R of the honing surface 5c) in the outer peripheral end Q of the cutting edge shoulder portion 5C is decreased, compared to a size (width H of the honing surface 5b) in the outer peripheral end P of the main cutting edge portion 5B. Therefore, welding of the cutting edge shoulder portion 5C can be more reliably prevented.

Moreover, since the size of the honing is decreased in this way, cutting quality of the cutting edge 5 can be improved in the cutting edge shoulder portion 5C. Therefore, it is possible to suppress a possibility that a burr may appear in penetrating a through-hole when the through-hole is drilled. The size of the honing may be continuously decreased from an inner peripheral side (inside in the radial direction) of the drill body 1 toward the outer peripheral end (outer peripheral end Q of the cutting edge shoulder portion 5C) of the cutting edge 5, may be constant in the main cutting edge portion 5B and may be continuously decreased from the outer peripheral end P toward the outer peripheral end Q, and may be constant and reach the outer peripheral end Q after being continuously decreased from the outer peripheral end P toward the outer peripheral end Q.

In addition, in the present embodiment, as described above, in order that the true rake angle θC in the outer peripheral end Q of the cutting edge shoulder portion 5C is increased on the negative rake angle side, compared to the true rake angle θB in the outer peripheral end P of the main cutting edge portion 5B, the tip flank 6 and the triangular chamfered portion 11 are formed in the outer peripheral end portion of the cutting edge 5, and the cutting edge shoulder portion 5C is formed in the intersection ridgeline portion between the triangular chamfered portion 11 and the tip flank 6.

Therefore, since the triangular chamfered portion 11 having a relatively small area is formed in the drill body of a normal drill, the true rake angle θC of the cutting edge shoulder portion 5C can be increased on the negative rake angle side, compared to the true rake angle θB of the main cutting edge portion 5B. Accordingly, the drill body 1 can be easily, efficiently, and economically manufactured.

In addition, in the present embodiment, the width W of the cutting edge shoulder portion 5C in an extending direction of the straight line N1 connecting the axis O and the outer peripheral end Q of the cutting edge shoulder portion 5C when viewed from the tip side in the direction of the axis O is equal to or smaller than 0.2×D, compared to the diameter D of the cutting edge 5. Therefore, it is possible to avoid a possibility that cutting resistance may unnecessarily increase. That is, when the width of the cutting edge shoulder portion 5C exceeds 0.2×D of the diameter D of the cutting edge 5, a portion where the true rake angle θC is increased on the negative rake angle side is excessively lengthened, thereby causing a possibility that cutting resistance may increase.

In addition, in the present embodiment, the size R of the honing of the cutting edge shoulder portion 5C is equal to or smaller than 0.8×H, compared to the size H of the honing of the main cutting edge portion 5B. Accordingly, cutting quality of the cutting edge shoulder portion 5C can be more reliably improved. That is, when the size R of the honing of the cutting edge shoulder portion 5C exceeds 0.8×H, compared to the size H of the honing of the main cutting edge portion 5B, the cutting quality of the cutting edge shoulder portion 5C is degraded. Accordingly, there is a possibility that appearance of a burr may not be suppressed in penetrating a through-hole. The size R of the honing of the cutting edge shoulder portion 5C may be equal to or smaller than 0.5×H, or may be equal to or smaller than 0.3×H, compared to the size H of the honing of the main cutting edge portion 5B.

In addition, in the present embodiment, the honing applied to the main cutting edge portion 5B is chamfer honing, and the honing applied to the cutting edge shoulder portion 5C is round honing. Therefore, cutting edge strength can be sufficiently secured in the main cutting edge portion 5B mainly used for drilling. While cutting edge strength can be maintained in the cutting edge shoulder portion 5C, further improved cutting quality can be achieved.

However, on the contrary, the honing applied to the cutting edge shoulder portion 5C may be honing having a straight line-shaped cross section as that of the chamfer honing or the compound honing, and may be round honing in which the main cutting edge portion 5B has a convex curved cross section. Both the main cutting edge portion 5B and the cutting edge shoulder portion 5C may be subjected to the chamfer honing or the compound honing. Alternatively, both the main cutting edge portion 5B and the cutting edge shoulder portion 5C may be subjected to the round honing.

Figure 8:
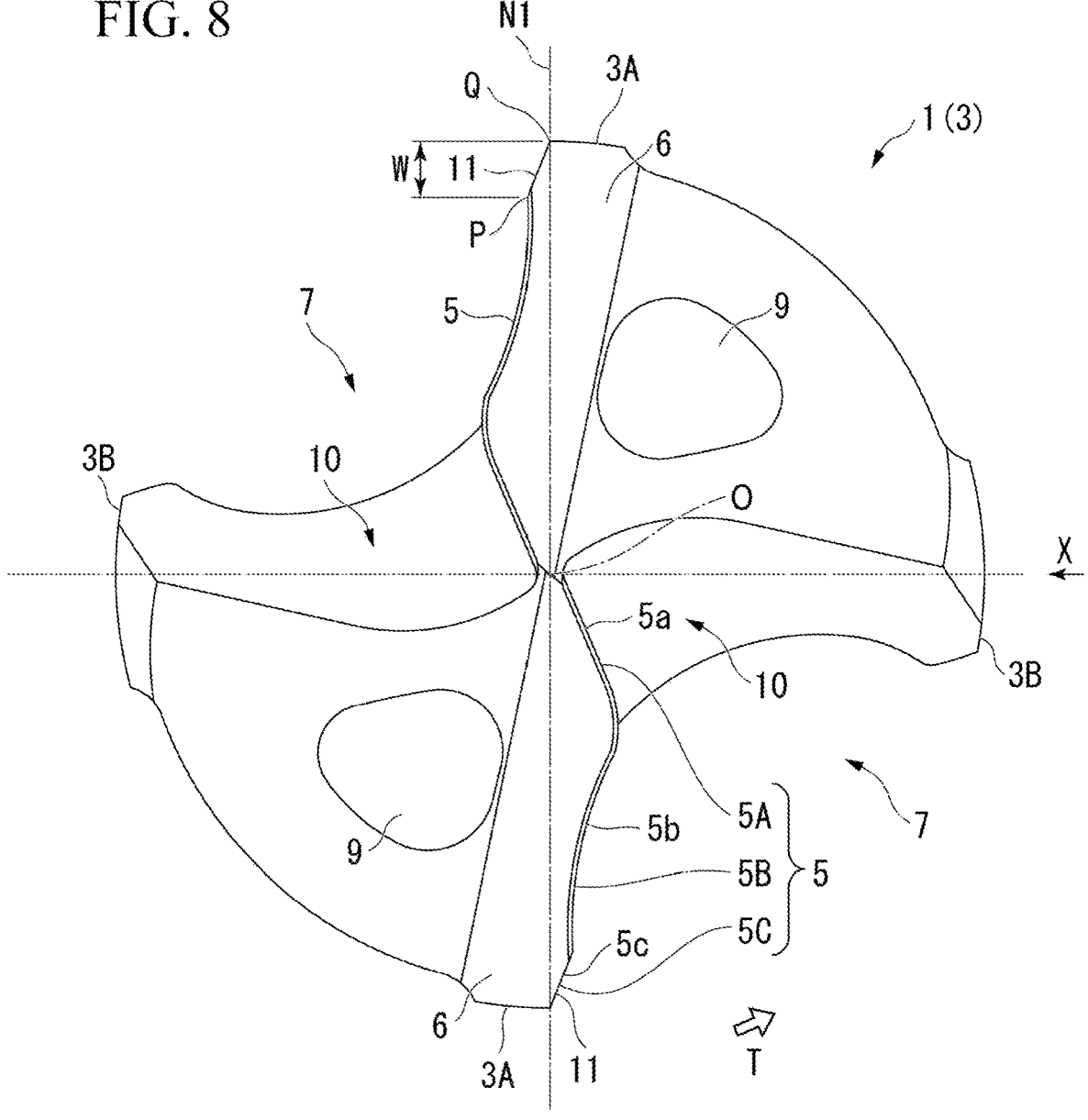
FIG. 8 is an enlarged front view of a cutting edge portion representing a modification example of the embodiment represented in FIG. 1.
Figure 9:
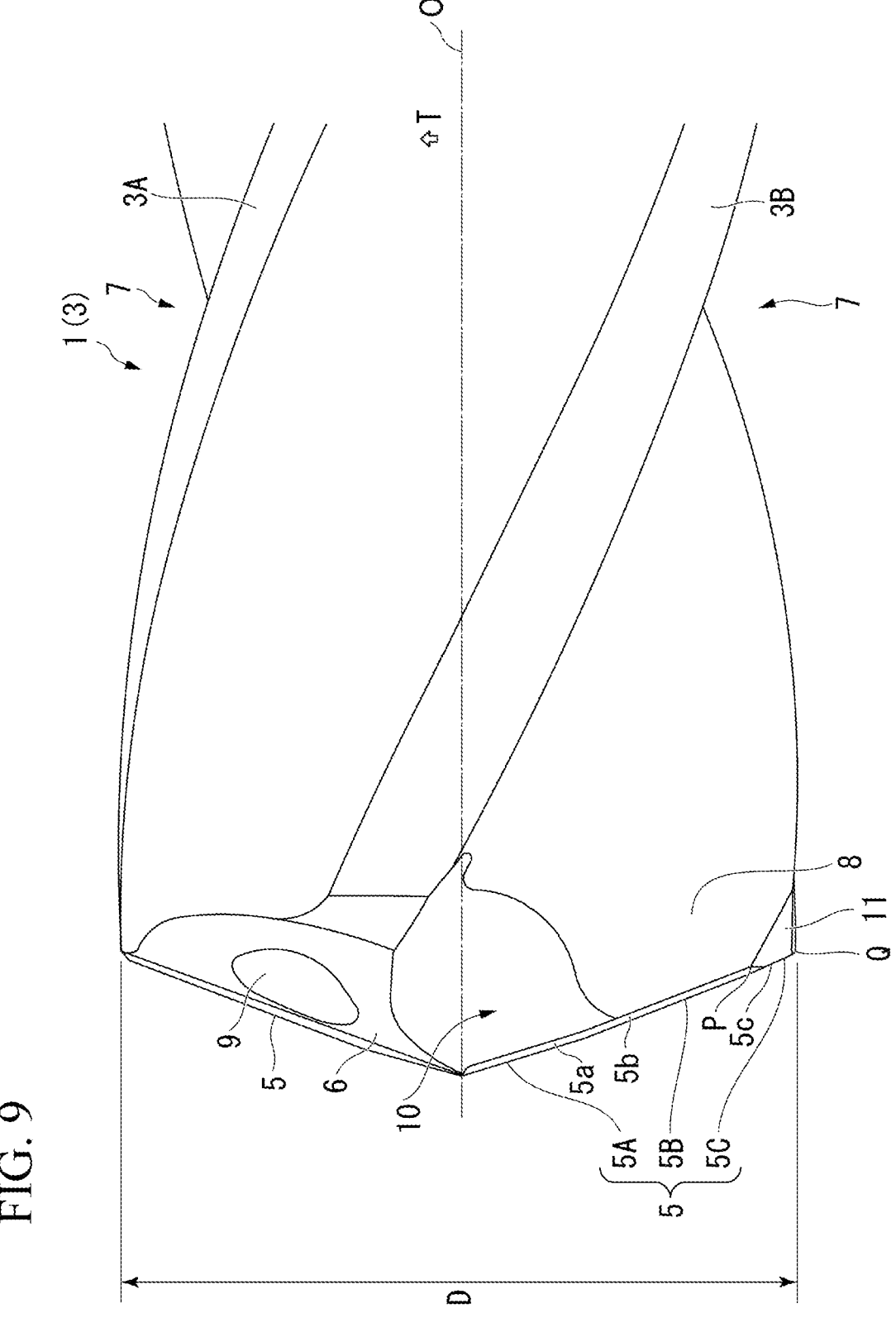
FIG. 9 is a side view when viewed in the direction of the arrow X in FIG. 8 (viewed in the direction perpendicular to the straight line N1).

In addition, in the first embodiment, the main cutting edge portion 5B is formed in a straight line shape when viewed from the tip side in the direction of the axis O. However, as in the modification examples represented in FIGS. 8 and 9, the main cutting edge portion 5B may be formed to be connected to the cutting edge shoulder portion 5C by extending to the side in the drill rotation direction T after extending in a concave curve shape recessed to the side in the direction opposite to the drill rotation direction T toward the outer peripheral side of the drill body 1 from a portion where the thinning cutting edge portion 5A is formed in a convex curve shape. In addition, in this modification example, second to sixth embodiments, and modification examples thereof (to be described later), the same reference numerals will be assigned to elements common to those of the first embodiment represented in FIGS. 1 to 7.

Figure 10:
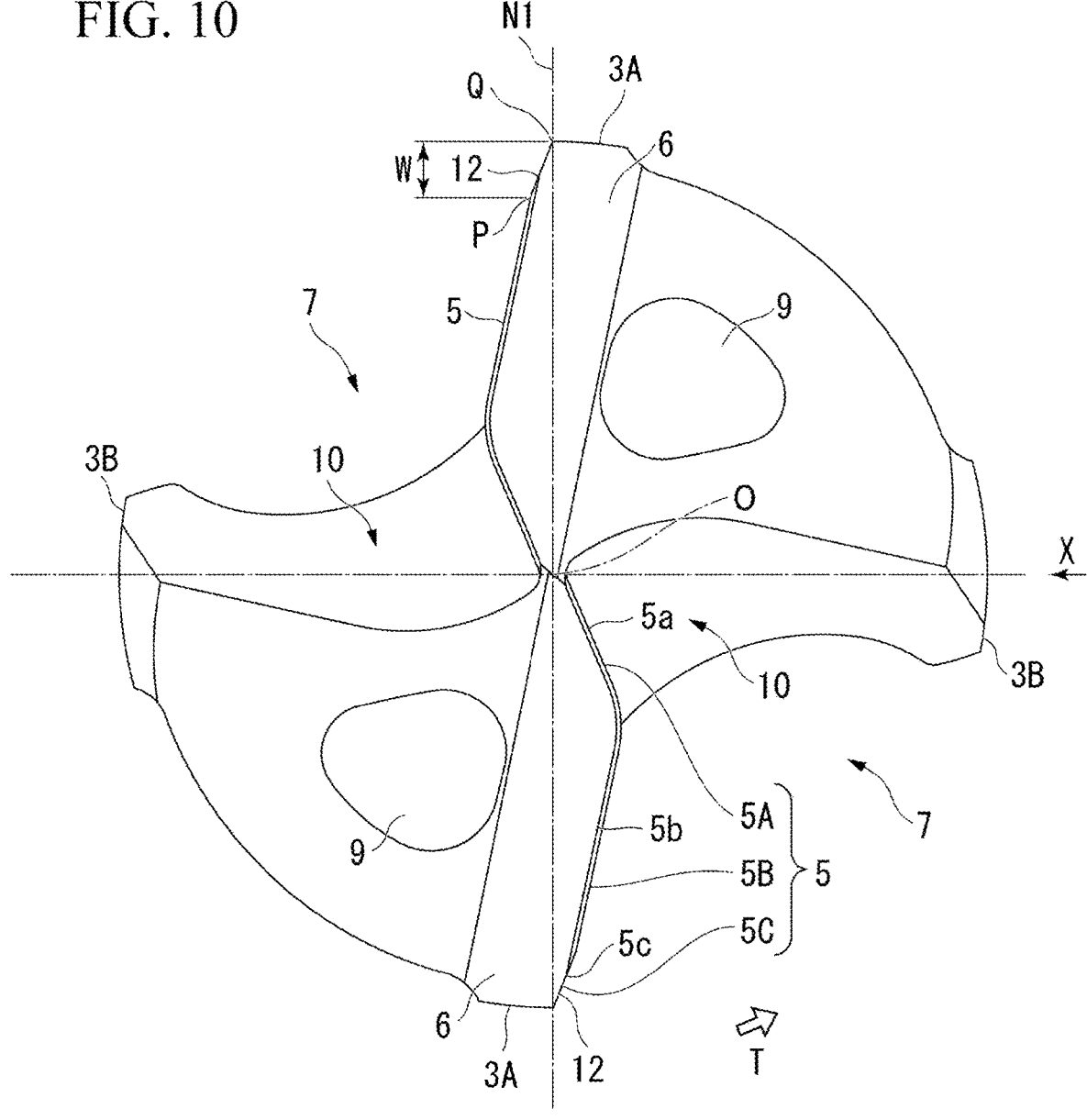
FIG. 10 is an enlarged front view of a cutting edge portion representing a second embodiment of the present invention.
Figure 11:
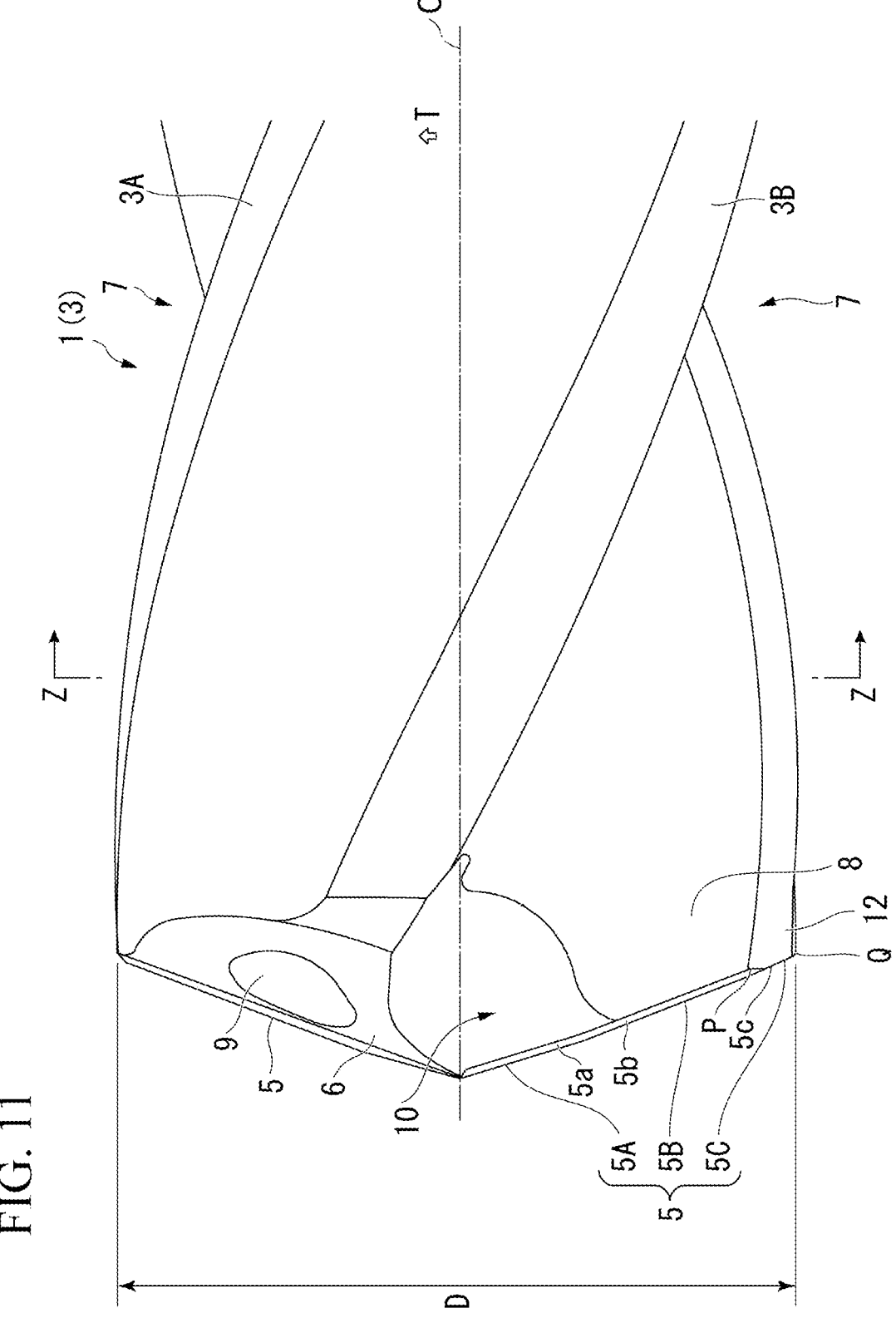
FIG. 11 is a side view when viewed in the direction of the arrow X in FIG. 10 (viewed in the direction perpendicular to the straight line N1).
Figure 12:
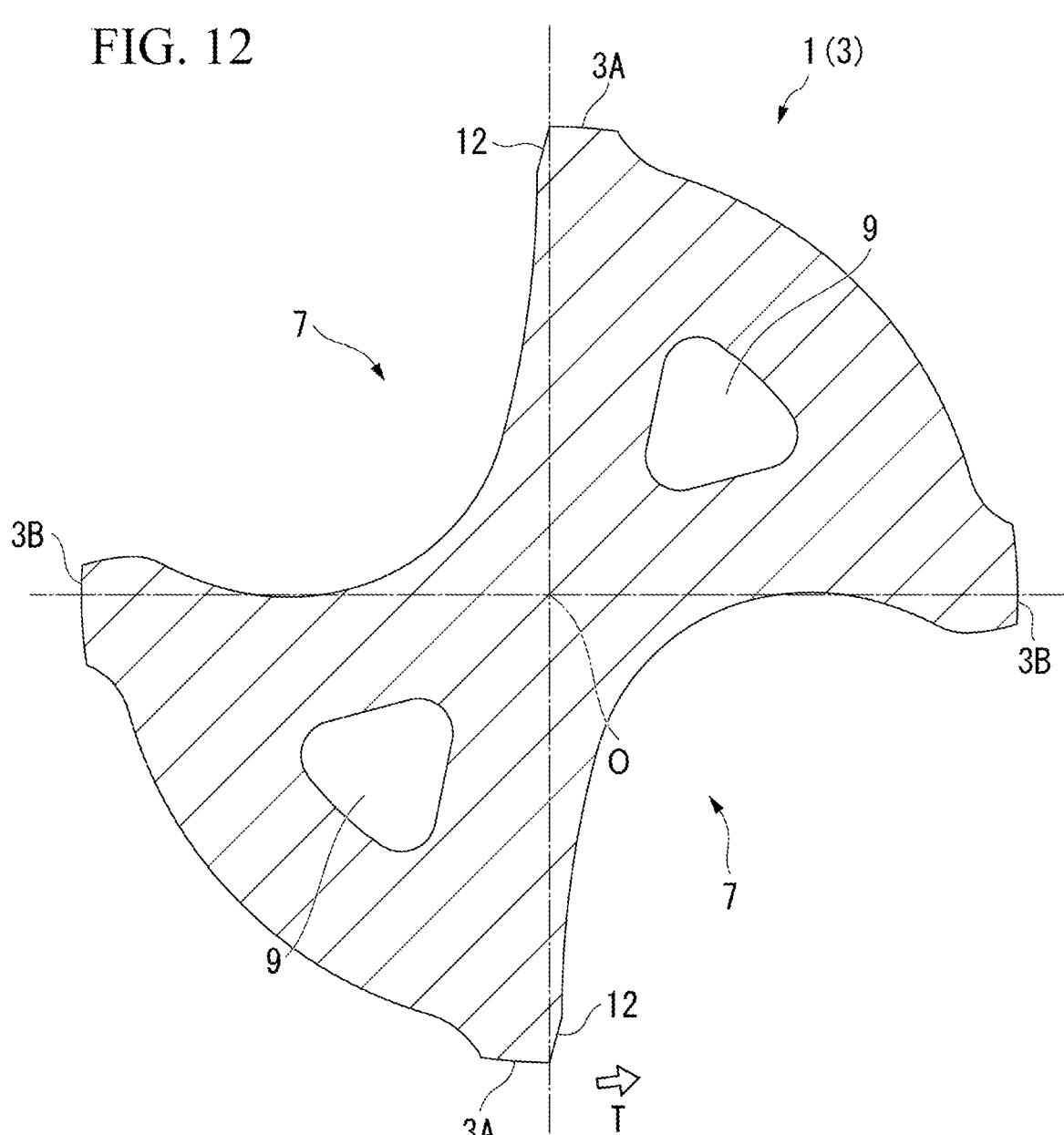
FIG. 12 is a sectional view taken along line ZZ in FIG. 11.

Next, FIGS. 10 to 12 illustrate the second embodiment of the present invention. In the second embodiment, a belt-shaped chamfered portion 12 intersecting at an obtuse angle with the wall surface on the inner peripheral side from the outer peripheral edge portion is formed on the outer peripheral edge portion of the wall surface of the chip discharging flute 7 which faces the drill rotation direction T is formed along the chip discharging flute 7, and the cutting edge shoulder portion 5C is formed in the intersection ridgeline portion between the belt-shaped chamfered portion 12 and the tip flank 6.

Similarly as represented in FIGS. 5 and 6, in the second embodiment as well, the true rake angle θC in the outer peripheral end Q of the cutting edge shoulder portion 5C is increased on the negative rake angle side, compared to the true rake angle θB in the outer peripheral end P of the main cutting edge portion 5B of the cutting edge 5. The size (radius R of the honing surface 5c) of the honing in the outer peripheral end Q of the cutting edge shoulder portion 5C is decreased, compared to the size (width H of the honing surface 5b) of the honing in the outer peripheral end P of the main cutting edge portion 5B. Therefore, an advantageous effect the same as that in the first embodiment can be achieved.

In addition, in the second embodiment, as described above, the belt-shaped chamfered portion 12 intersecting at an obtuse angle with the wall surface on the inner peripheral side from the outer peripheral edge portion is formed along the chip discharging flute 7 in the outer peripheral edge portion of the wall surface of the chip discharging flute 7 which faces the drill rotation direction T, and the cutting edge shoulder portion 5C is formed in the intersection ridgeline portion between the belt-shaped chamfered portion 12 and the tip flank 6.

Therefore, when a new cutting edge 5 is sharpened after cutting quality of the cutting edge 5 is degraded due to wear, the true rake angle θC of the cutting edge shoulder portion 5C can be increased on the negative rake angle side by simply grinding the tip flank 6, compared to the main cutting edge portion 5B. Therefore, for example, as in the first embodiment, it is not necessary to form the cutting edge shoulder portion 5C by re-forming the triangular chamfered portion 11 after grinding the tip flank 6.

Figure 13:
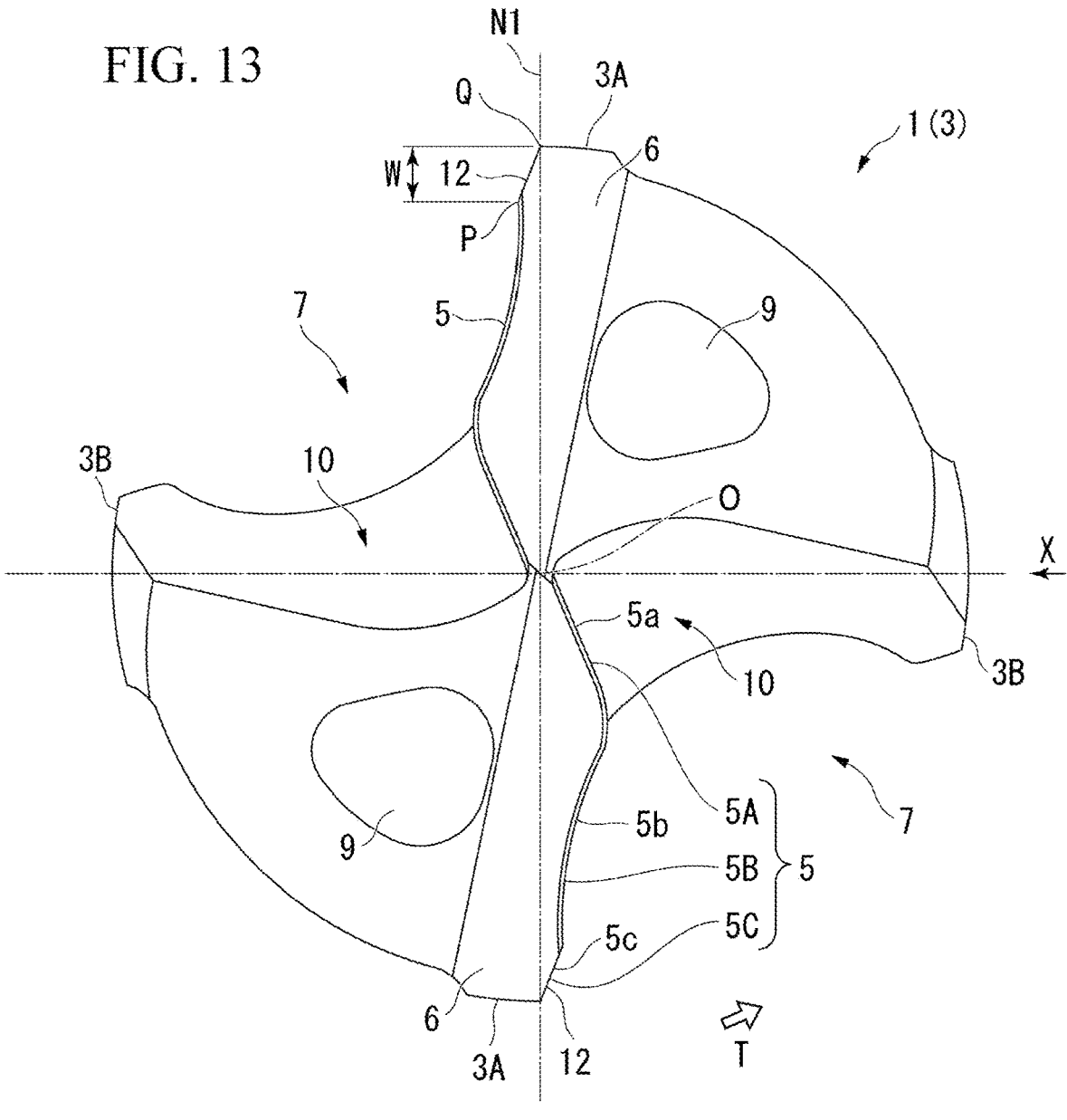
FIG. 13 is an enlarged front view of a cutting edge portion representing a modification example of the embodiment represented in FIG. 10.
Figure 14:
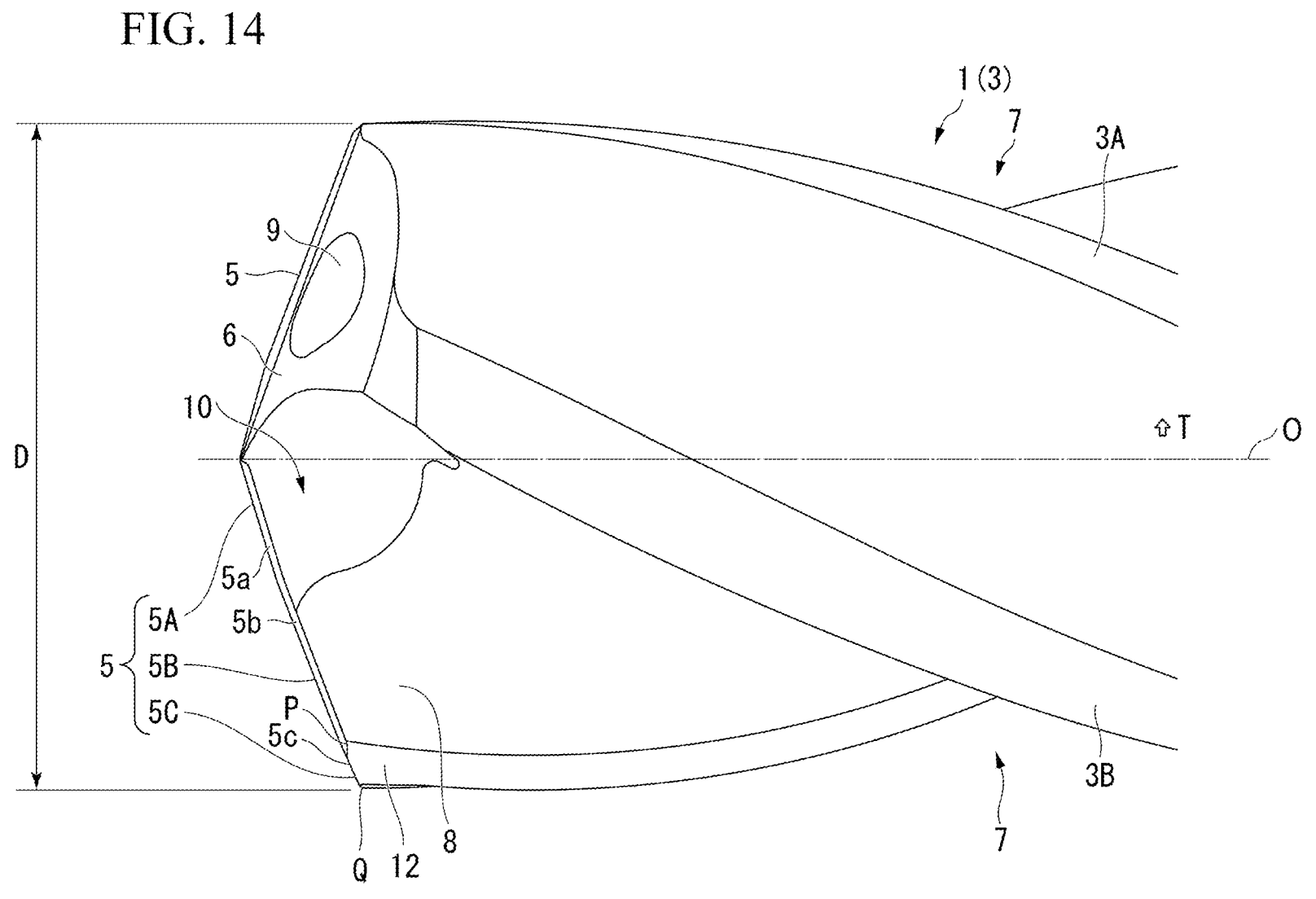

In the second embodiment as well, as in modification examples in FIGS. 13 and 14, similarly to the modification example of the first embodiment, the main cutting edge portion 5B may be formed to be connected to the cutting edge shoulder portion 5C by extending to the side in the drill rotation direction T after extending in a concave curve shape recessed to the side in the direction opposite to the drill rotation direction T toward the outer peripheral side of the drill body 1 from a portion where the thinning cutting edge portion 5A is formed in a convex curve shape.

Furthermore, in the first and second embodiments and the modification examples, the triangular chamfered portion 11 or the belt-shaped chamfered portion 12 is formed on the rake face 8 side of the cutting edge 5. In this manner, the true rake angle θC in the outer peripheral end Q of the cutting edge shoulder portion 5C is increased on the negative rake angle side, compared to the true rake angle GB in the outer peripheral end P of the main cutting edge portion 5B, and the size of the honing in the outer peripheral end Q of the cutting edge shoulder portion 5C is decreased, compared to the size of the honing in the outer peripheral end P of the main cutting edge portion 5B. Alternatively, as in a third embodiment represented in FIGS. 15 and 16 and a fourth embodiment represented in FIGS. 17 and 18, a chamfered portion may be formed on the tip flank 6 side of the cutting edge 5.

Figure 15:
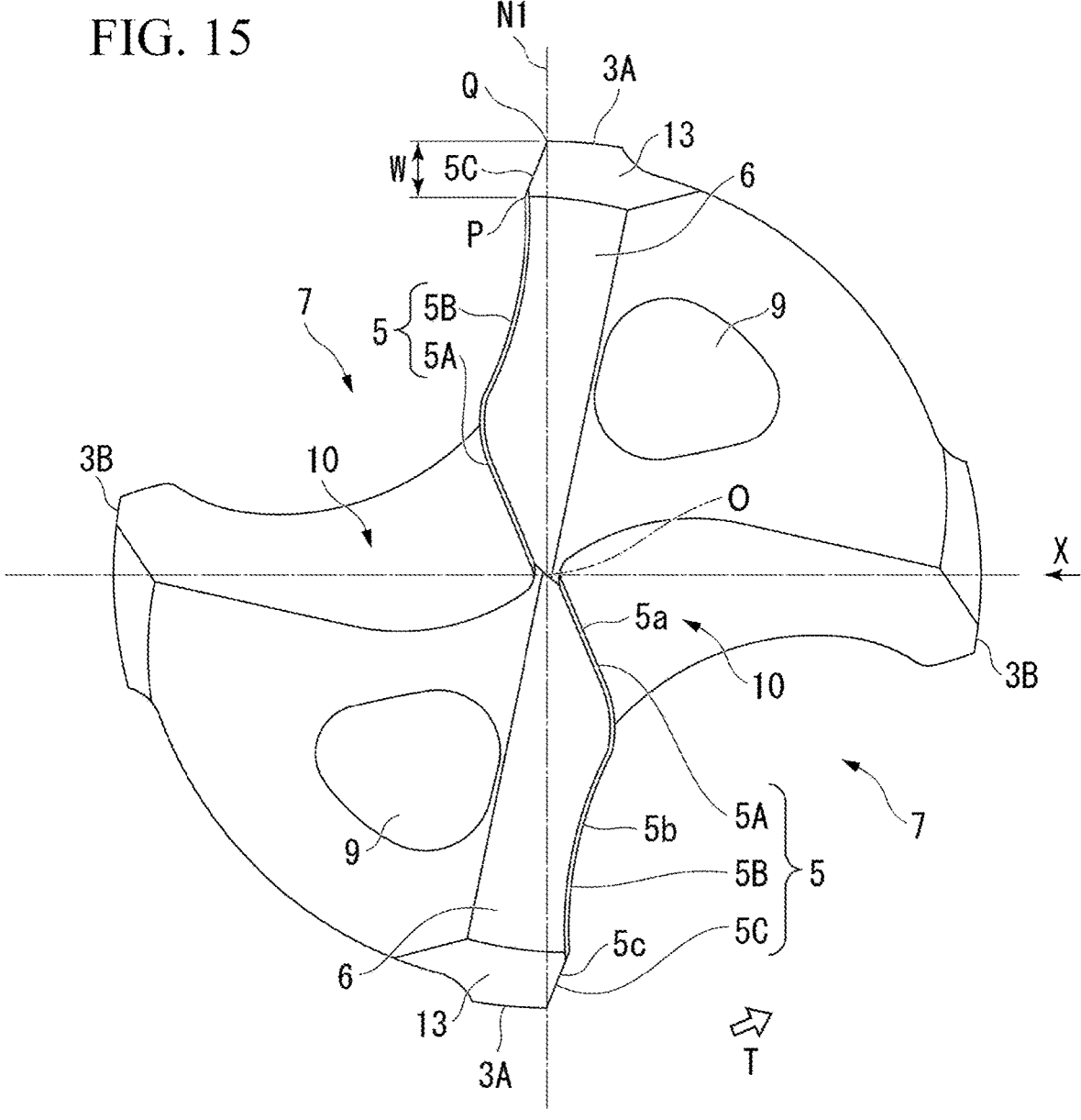
FIG. 15 is an enlarged front view of a cutting edge portion representing a third embodiment of the present invention.
Figure 16:
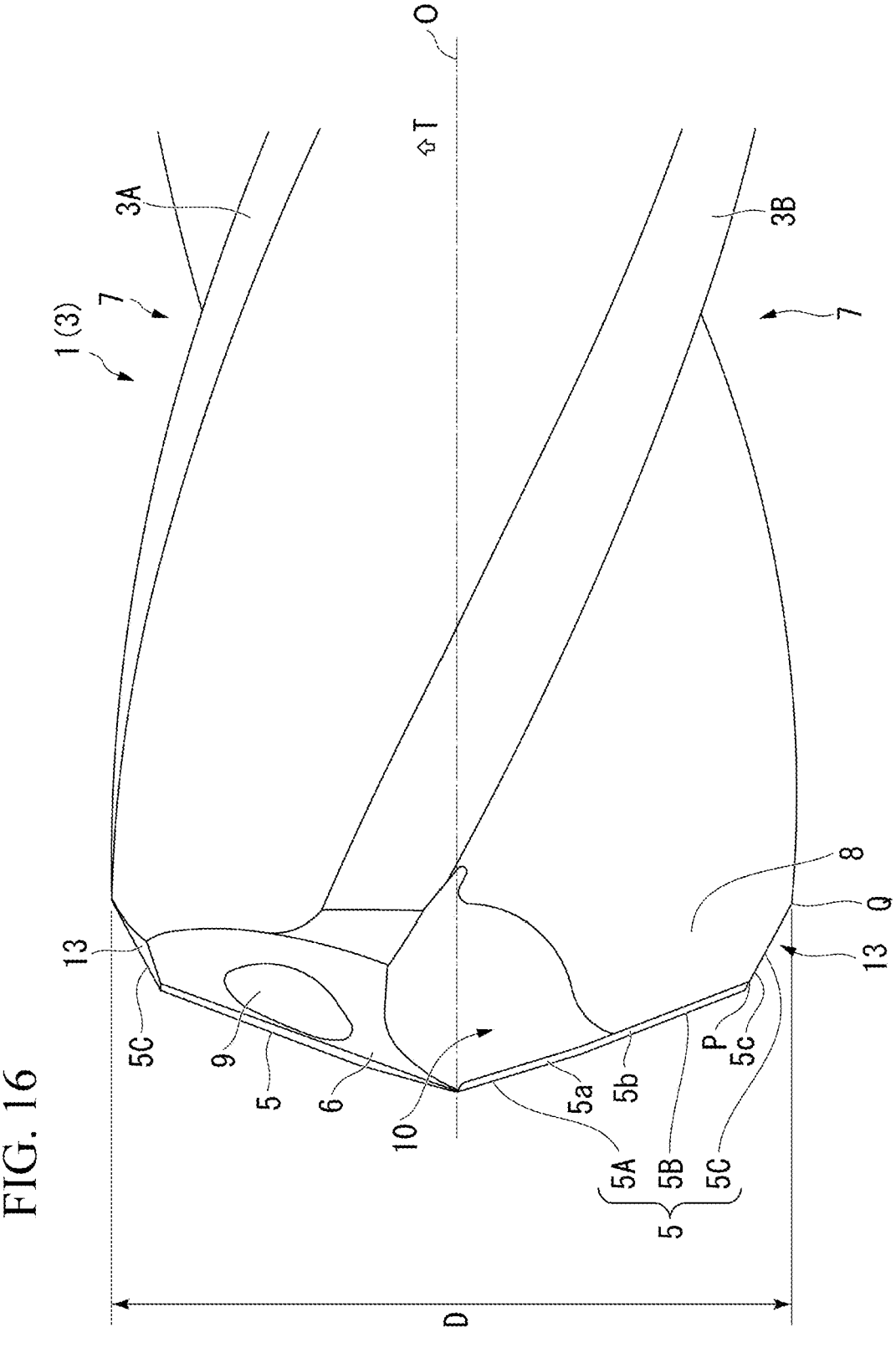
FIG. 16 is a side view when viewed in the direction of the arrow X in FIG. 15 (viewed in the direction perpendicular to the straight line N1).

In the embodiments, in the third embodiment represented in FIGS. 15 and 16, a planar chamfered portion 13 intersecting at an obtuse angle with the first margin 3A which is the outer peripheral surface of the cutting edge portion 3 of the drill body 1 extending to the side opposite to the drill rotation direction T from the rake face 8 and the tip flank 6 on the inner peripheral side from the outer peripheral portion is formed in the outer peripheral portion of the tip flank 6. The straight line-shaped cutting edge shoulder portion 5C is formed in the intersection ridgeline portion between the planar chamfered portion 13 and the rake face 8.

Figure 17:
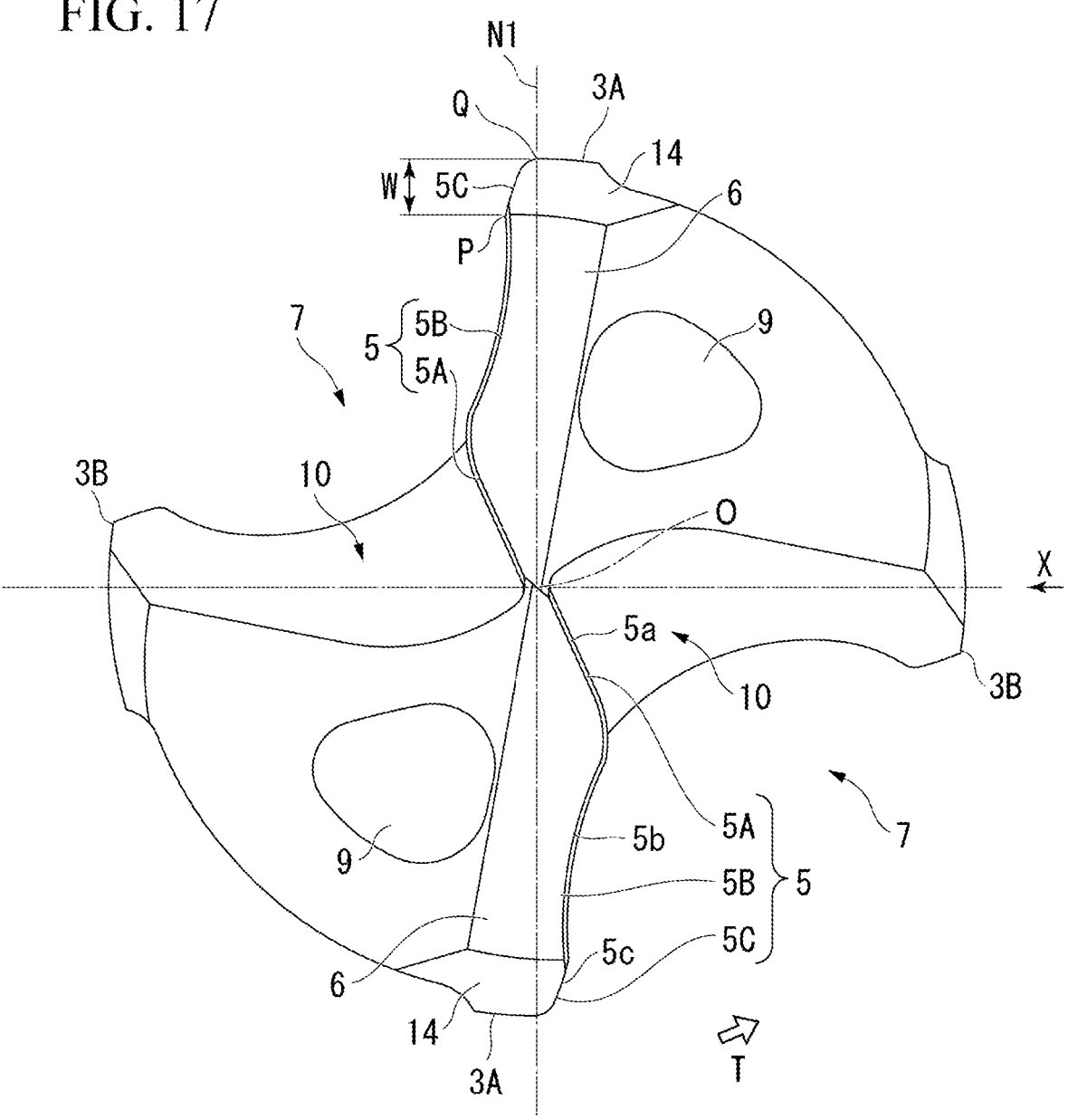
FIG. 17 is an enlarged front view of a cutting edge portion representing a fourth embodiment of the present invention.
Figure 18:
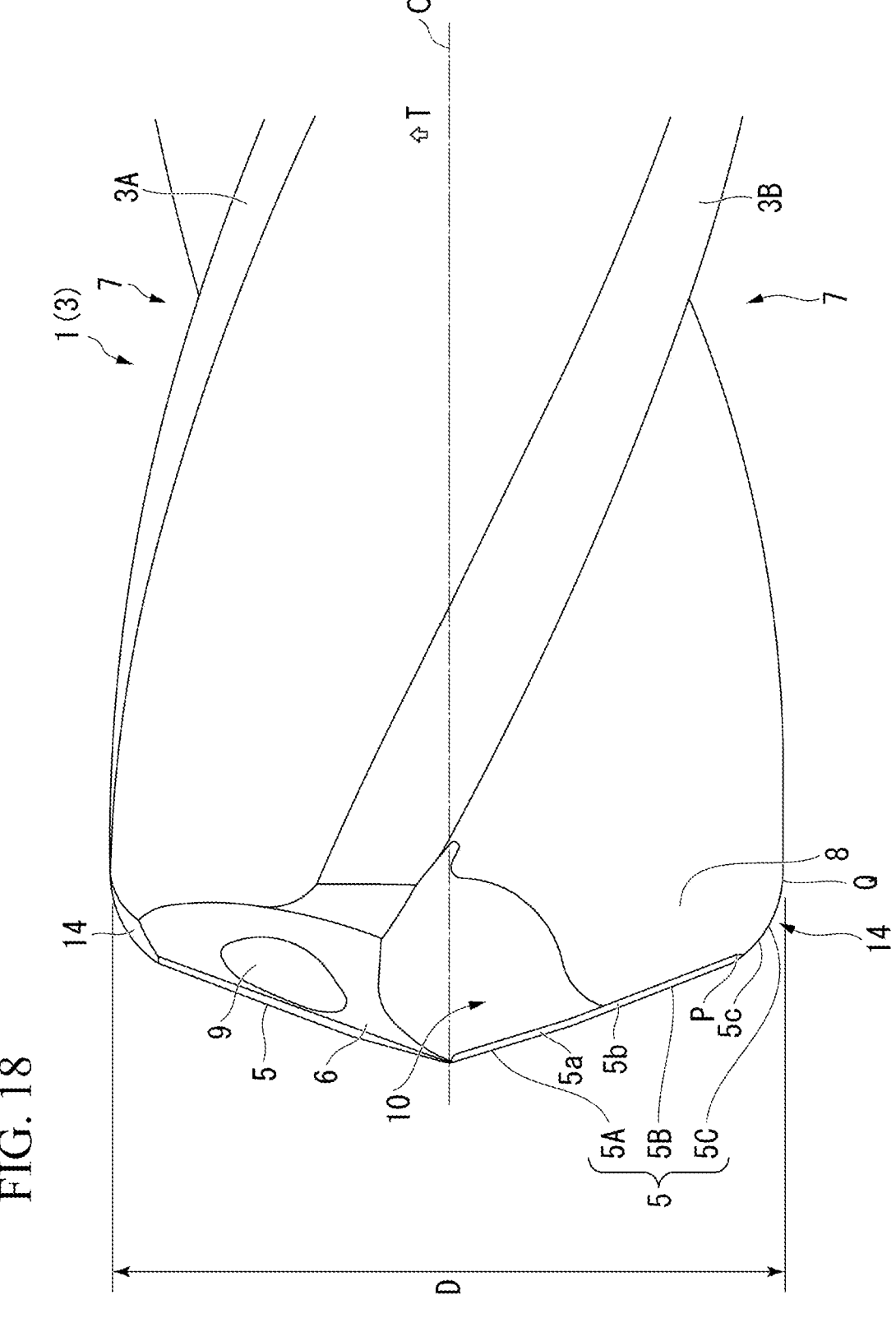
FIG. 18 is a side view when viewed in the direction of the arrow X in FIG. 17 (viewed in the direction perpendicular to the straight line N1).

In addition, in the fourth embodiment represented in FIGS. 17 and 18, a convex curved chamfered portion 14 coming into contact with the first margin 3A which is the outer peripheral surface of the cutting edge portion 3 of the drill body 1 extending to the side opposite to the drill rotation direction T from the rake face 8 and the tip flank 6 on the inner peripheral side from the outer peripheral portion is formed in the outer peripheral portion of the tip flank 6. A cutting edge shoulder portion 5C having a convex curved shape when viewed in a direction facing the rake face 8 is formed in the intersection ridgeline portion between the convex curved chamfered portion 14 and the rake face 8.

In a case of the third and fourth embodiments, the true rake angle θC of the cutting edge shoulder portion 5C is can be increased on the negative rake angle side without performing chamfering for the triangular chamfered portion 11 or the belt-shaped chamfered portion 12 on the rake face 8 side, compared to the main cutting edge portion 5B. Therefore, it is possible to prevent a situation in which chip discharge performance is affected by performing the chamfering on the rake face 8 side.

Figure 19:
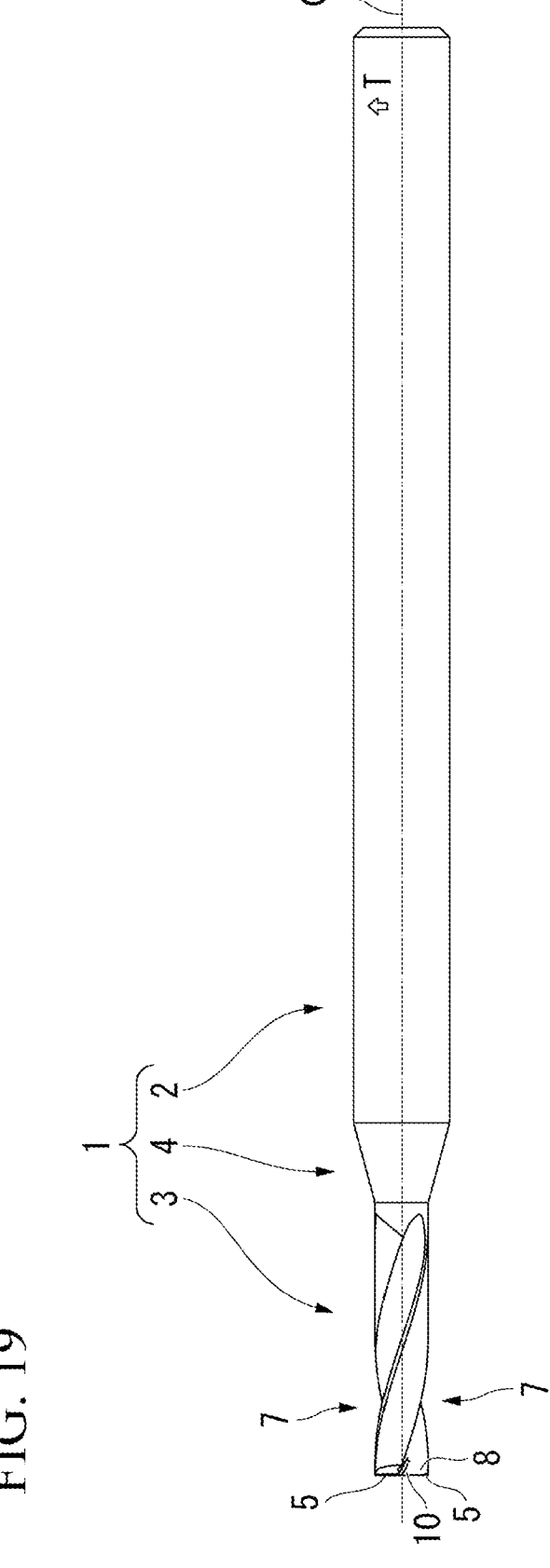
FIG. 19 is a side view representing a fifth embodiment of the present invention.
Figure 20:
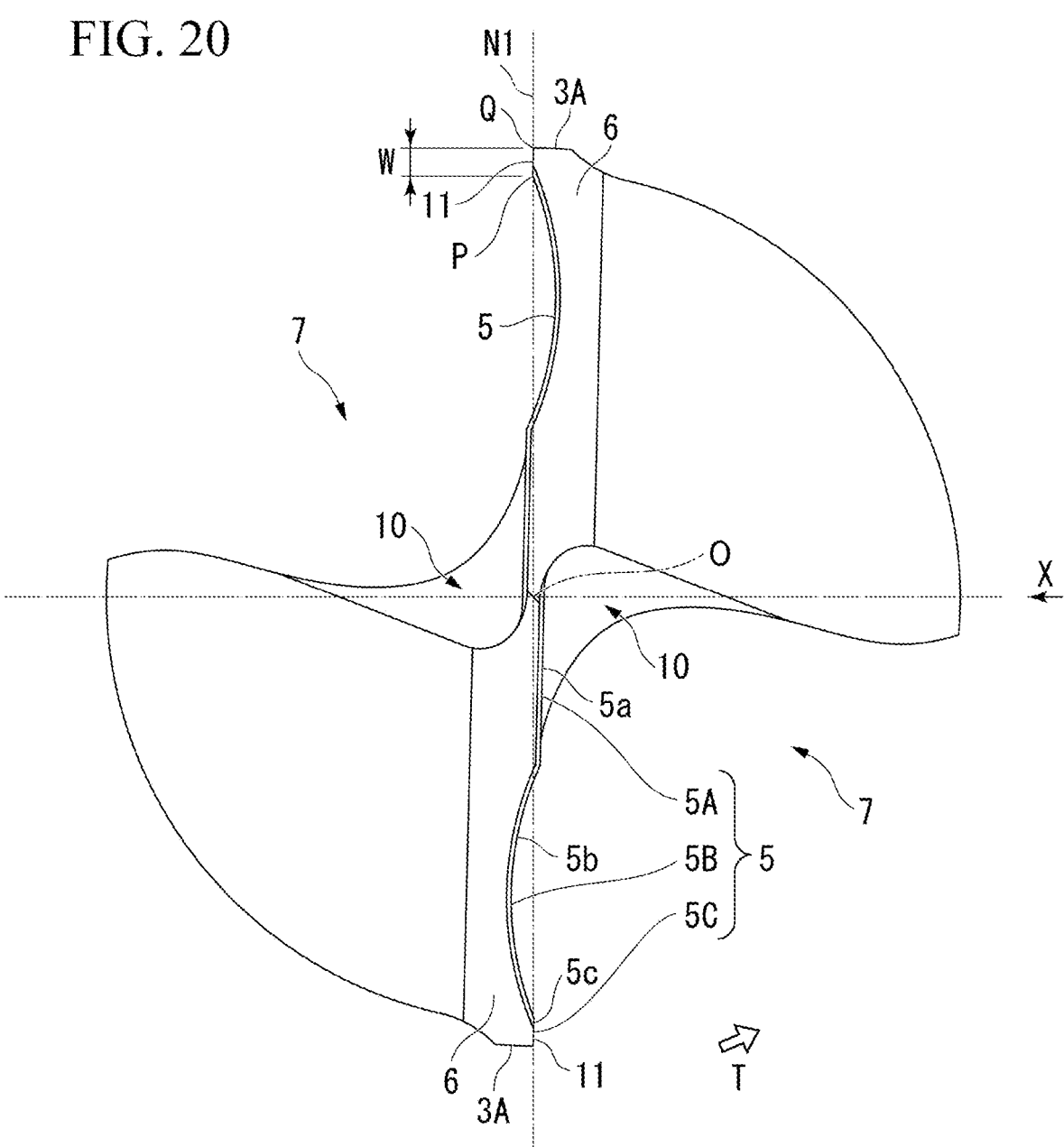
FIG. 20 is an enlarged front view of the cutting edge portion of the embodiment represented in FIG. 19.
Figure 21:
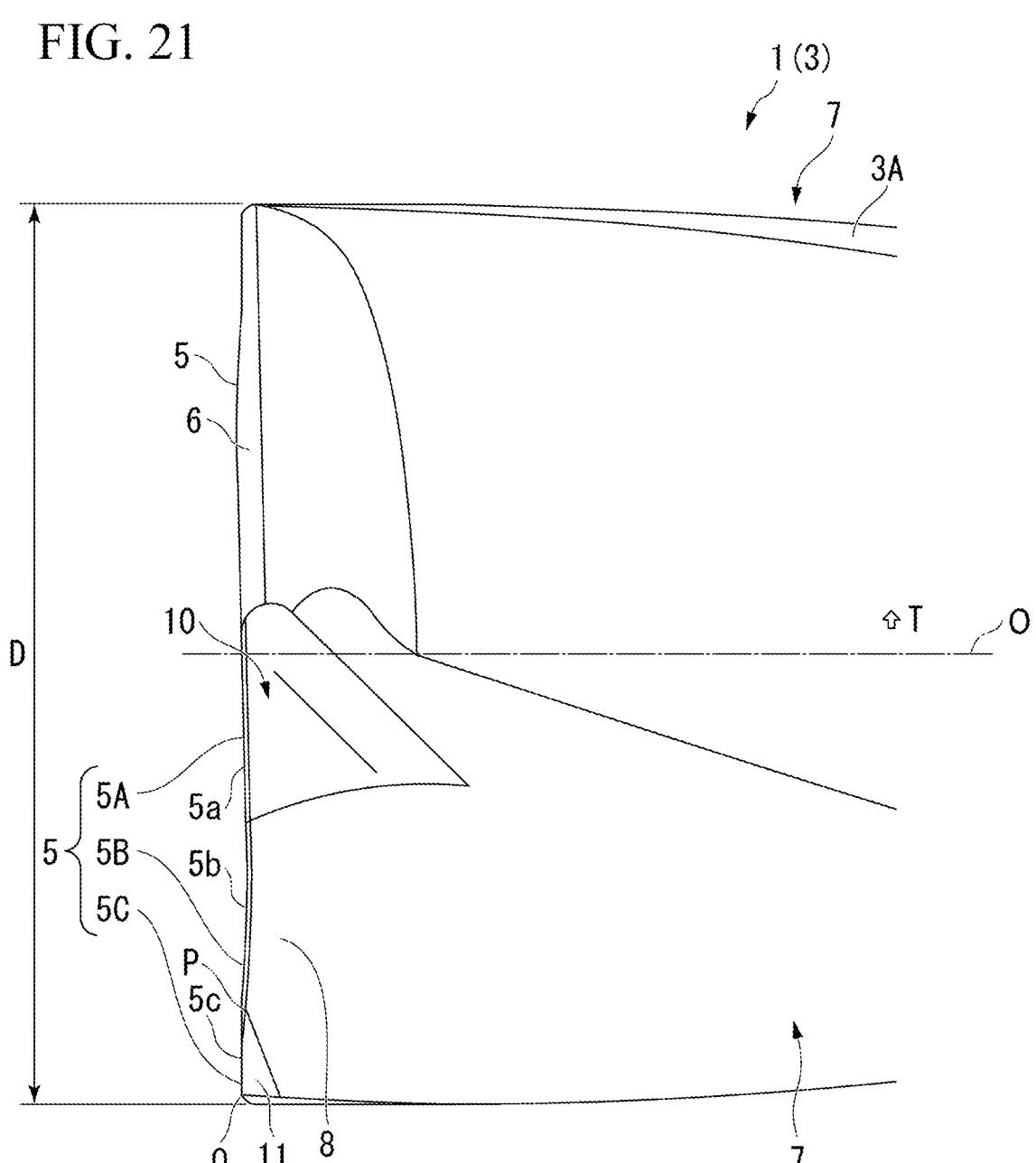
FIG. 21 is a side view when viewed in the direction of the arrow X in FIG. 20 (viewed in the direction perpendicular to the straight line N1).
Figure 22:
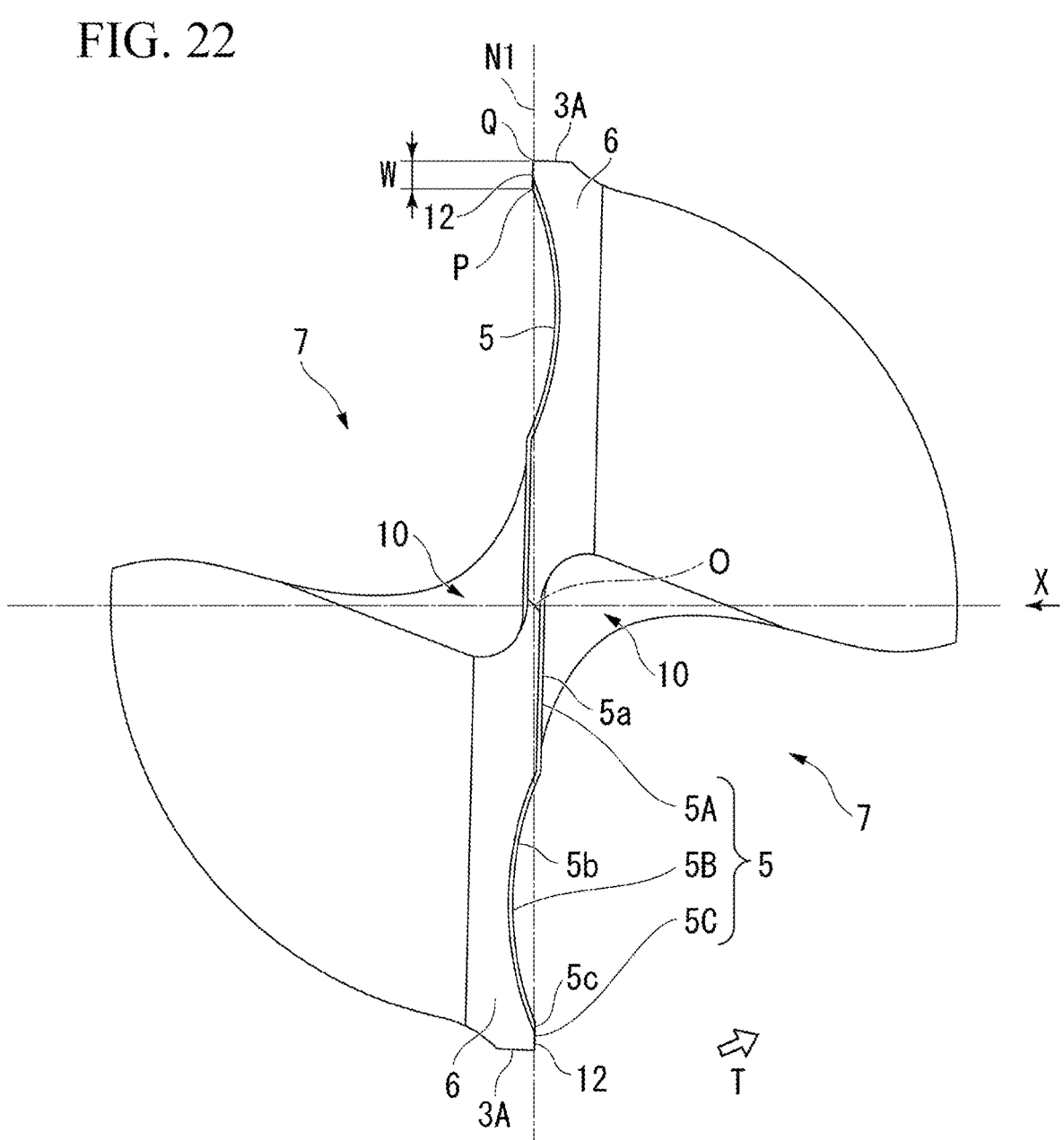
FIG. 22 is an enlarged front view of a cutting edge portion representing a sixth embodiment of the present invention.
Figure 23:
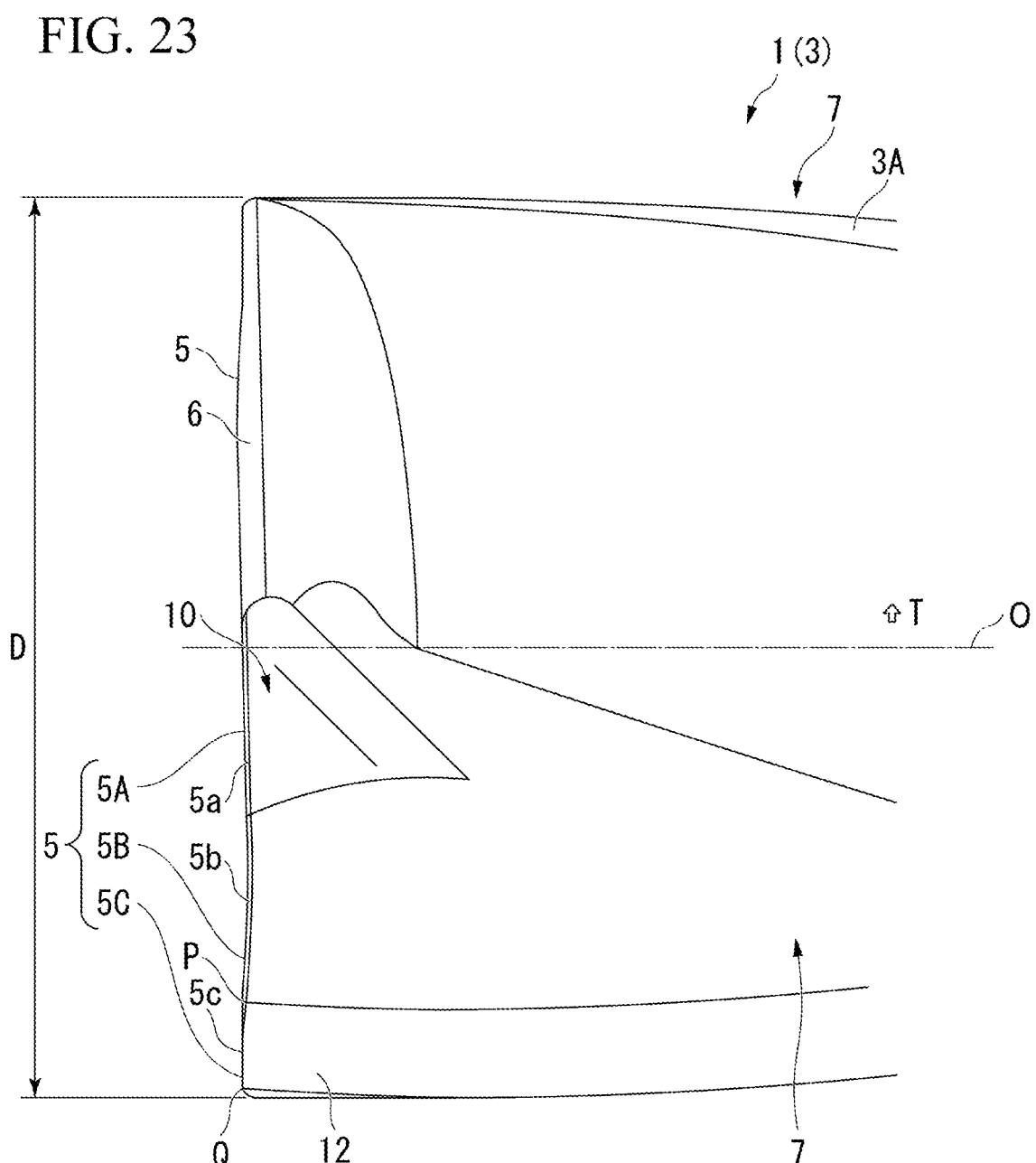
FIG. 23 is a side view when viewed in the direction of the arrow X in FIG. 22 (viewed in the direction perpendicular to the straight line N1).

Furthermore, FIGS. 19 to 21 represent a fifth embodiment of the present invention, and FIGS. 22 and 23 represent a sixth embodiment of the present invention. The fifth and sixth embodiments are adopted for a case where the present invention is applied to a counter boring drill. That is, in the first to fourth embodiments and the modification examples, the cutting edge 5 extends toward the rear end side as the cutting edge 5 is directed toward the outer peripheral side of the drill body 1, and the cutting edge 5 is provided with the point angle. In contrast, in the fifth and sixth embodiments, the cutting edge 5 extends substantially along a plane perpendicular to the axis O, and is provided with a point angle of 180°.

In the fifth embodiment, the tip flank 6 and the triangular chamfered portion 11 disposed on the wall surface facing the drill rotation direction T of the chip discharging flute 7 are formed in the outer peripheral end portion of the cutting edge 5. The triangular chamfered portion 11 is inclined to the side opposite to the drill rotation direction T as the triangular chamfered portion 11 is directed from the rake face 8 toward the intersection ridgeline portion (leading edge) intersecting with the outer peripheral surface (first margin 3A) of the drill body 1 extending to the side opposite the drill rotation direction T. The cutting edge shoulder portion 5C is formed in the intersection ridgeline portion between the triangular chamfered portion 11 and the tip flank 6.

In addition, in the sixth embodiment, the belt-shaped chamfered portion 12 intersecting at an obtuse angle with the wall surface on the inner peripheral side from the outer peripheral edge portion is formed along the chip discharging flute 7 in the outer peripheral edge portion of the wall surface of the chip discharging flute 7 which faces the drill rotation direction T. The cutting edge shoulder portion 5C is formed in the intersection ridgeline portion between the belt-shaped chamfered portion 12 and the tip flank 6. In the fifth and sixth embodiments, the second margin 3B and the coolant hole 9 are not formed.

In this counter boring drill, the point angle of the cutting edge 5 is 180°. Accordingly, the cutting edge 5 cuts off a workpiece material at once, and an impact load is likely to act on the cutting edge 5. In contrast, in the fifth and sixth embodiments, the true rake angle θC in the outer peripheral end Q of the cutting edge shoulder portion 5C is increased on the negative rake angle side, and the size of the honing is decreased, compared to the outer peripheral end P of the main cutting edge portion 5B. The cutting edge strength can be secured by increasing a wedge angle of the cutting edge shoulder portion 5C as described above. Therefore, it is possible to prevent a possibility that the cutting edge shoulder portion 5C may be defective due to an impact load.

Figure 24:
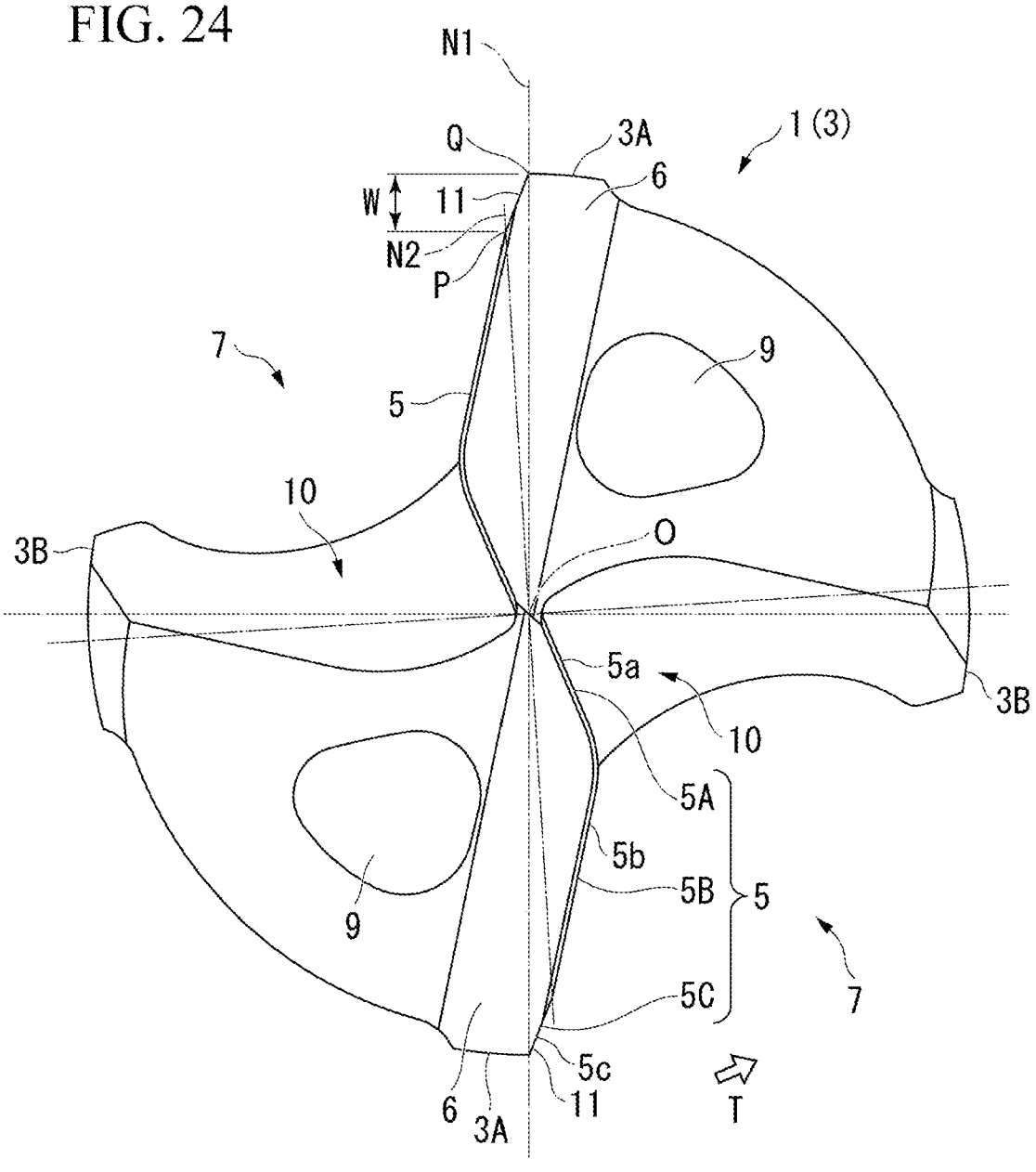
FIG. 24 is an enlarged front view of a cutting edge portion representing a seventh embodiment of the present invention.
Figure 25:
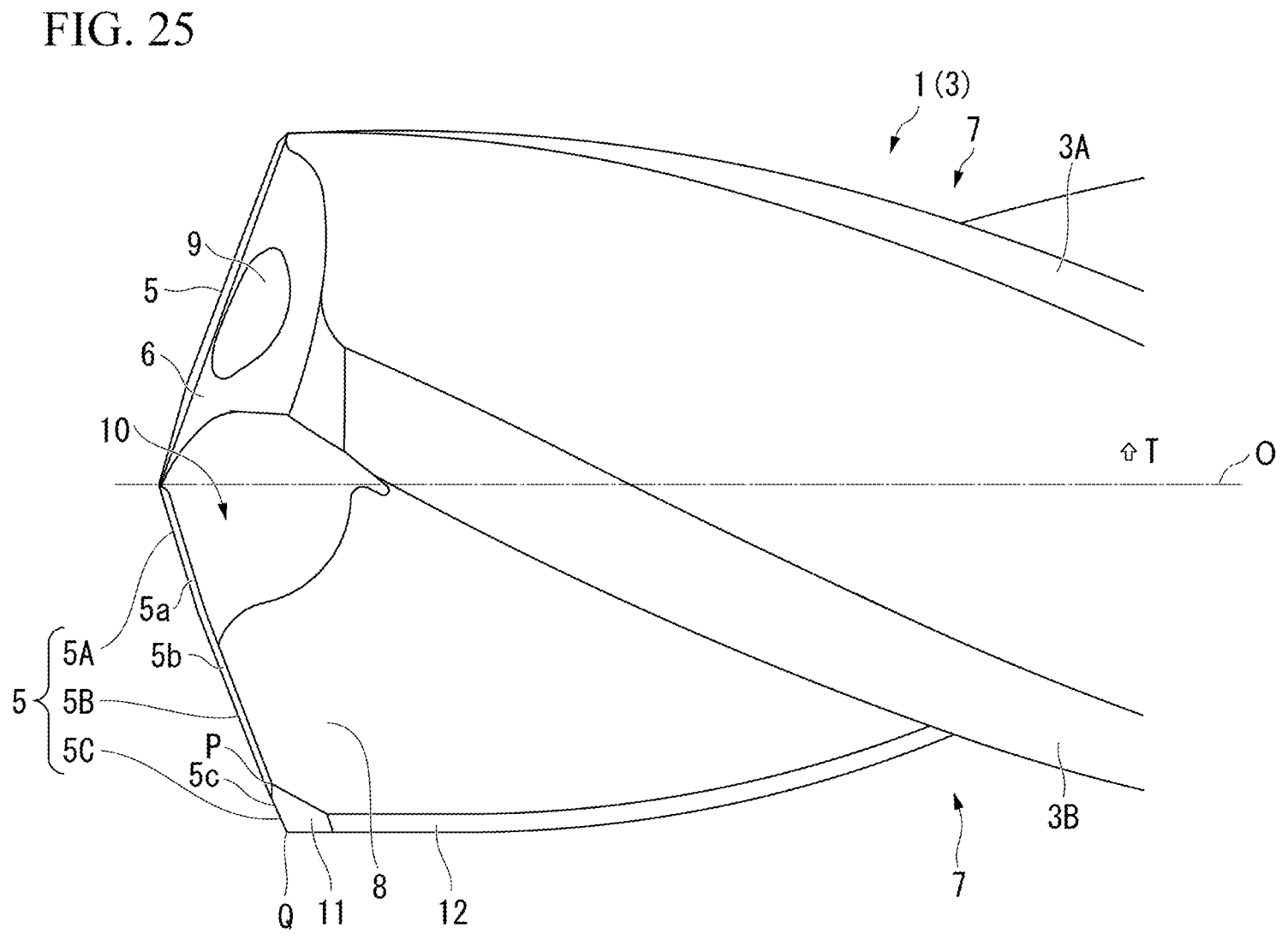
Figure 26:
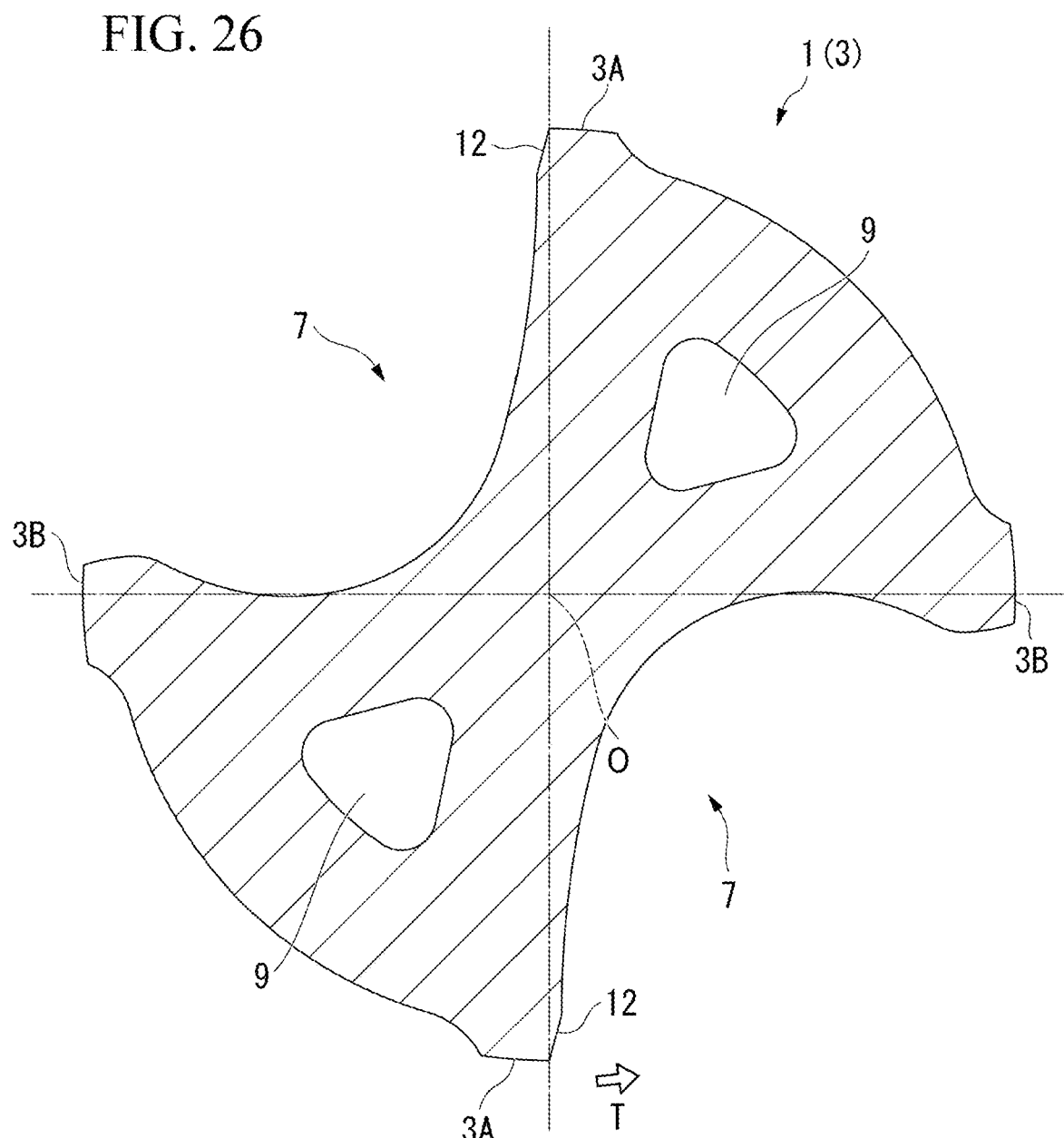
FIG. 26 is a sectional view (cross-sectional view) representing the cutting edge portion of the drill in FIG. 24.

FIGS. 24 to 26 represent a seventh embodiment of the present invention. In the seventh embodiment, the belt-shaped chamfered portion 12 intersecting at an obtuse angle with the wall surface on the inner peripheral side from the outer peripheral edge portion is formed along the chip discharging flute 7 in the outer peripheral edge portion of the wall surface of the chip discharging flute 7 which faces the drill rotation direction T. The chamfered portion 11 is formed in the tip outer peripheral portion of the wall surface of the chip discharging flute 7. That is, the drill of the present embodiment includes a configuration in which the belt-shaped chamfered portion 12 and the chamfered portion 11 are combined with each other. The cutting edge shoulder portion 5C is formed in the intersection ridgeline portion between the chamfered portion 11 and the tip flank 6. Accordingly, the true rake angle θC of the cutting edge shoulder portion 5C is increased on the negative rake angle side, compared to the true rake angle θB of the main cutting edge portion 5B.

More specifically, as represented in FIG. 25, in the present embodiment, the chamfered portion 11 is formed on the wall surface to cut off the tip portion of the belt-shaped chamfered portion 12. In this manner, the chamfered portion 11 has a square shape when viewed from the side in the drill rotation direction T. Specifically, the chamfered portion 11 has a trapezoidal shape in which the length of a lower base is longer than the length of an upper base.

In this way, the chamfered portion 11 is not limited to the triangular chamfered portion 11 described in the first embodiment, and may be a square chamfered portion 11. In addition, the chamfered portion 11 may have a polygonal shape other than the triangular shape or the square shape.

In addition, in the seventh embodiment, as in the first embodiment described above, as represented in FIG. 24, the main cutting edge portion 5B extends in a straight line shape when the drill is viewed from the tip side in the direction of the axis O. However, the configuration not limited thereto.

Figure 27:
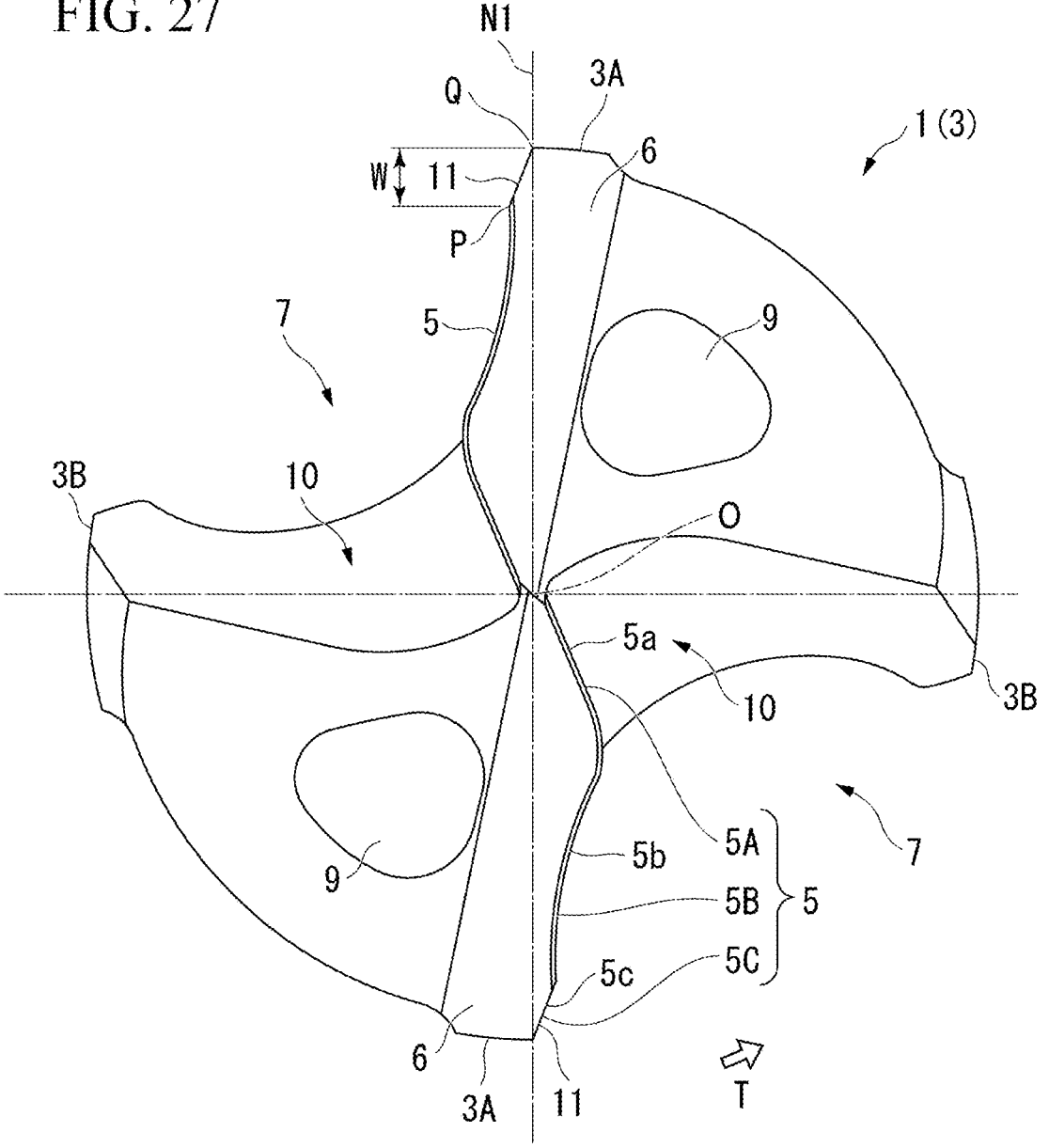
FIG. 27 is an enlarged front view of a cutting edge portion representing a modification example of the seventh embodiment.
Figure 28:
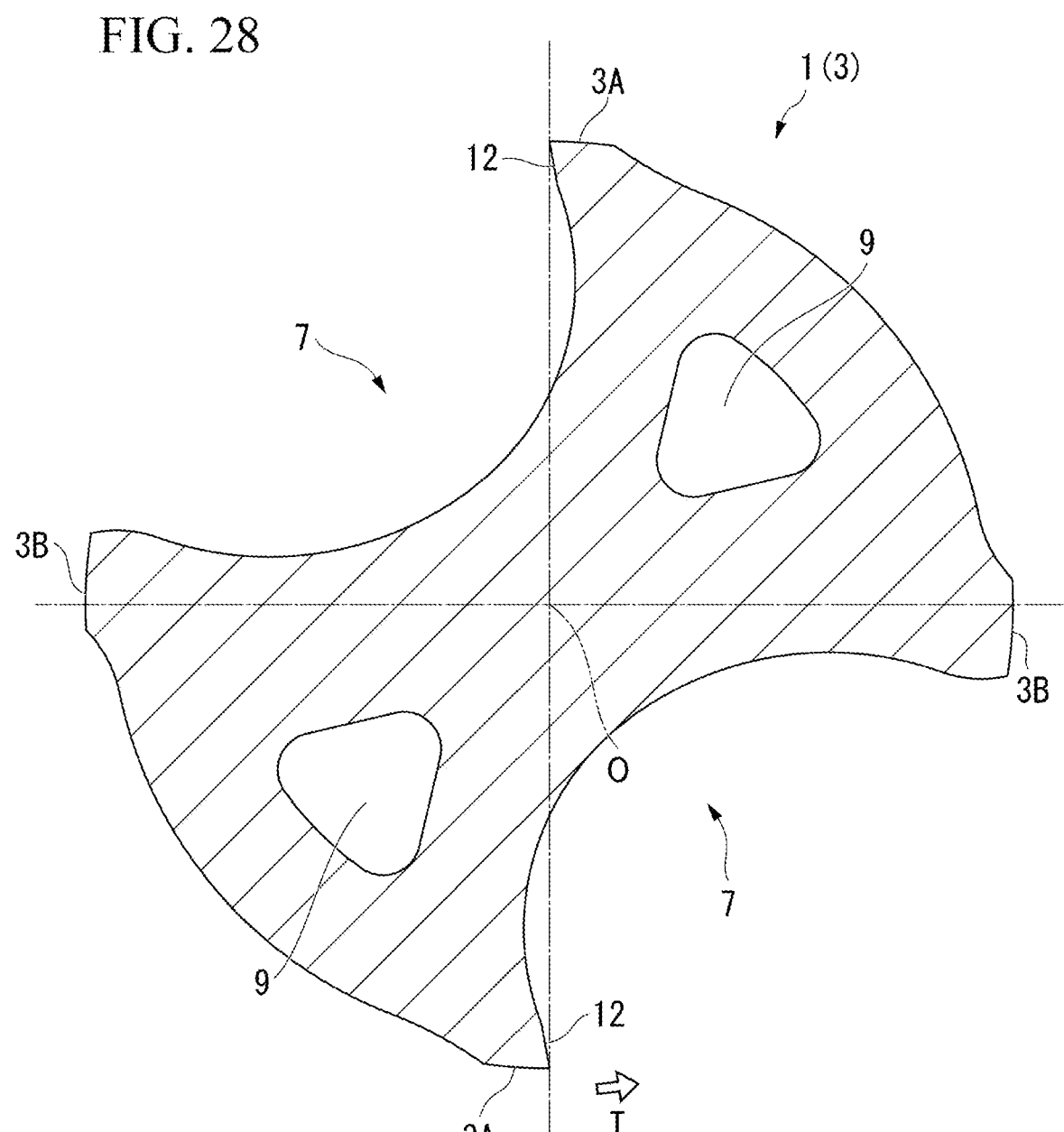
FIG. 28 is a sectional view (cross-sectional view) representing the cutting edge portion of the drill in FIG. 27.

Here, FIGS. 27 and 28 represent a modification example of the seventh embodiment. As represented in FIG. 27, the main cutting edge portion 5B may have a concave curved shape recessed toward the side opposite to the drill rotation direction T, when viewed from the tip side in the direction of the axis O.

According to the present invention, all of the configurations described in the above-described embodiments and modification examples may be combined with each other within the scope not departing from the concept of the present invention. Alternatively, additions, omissions, or substitutions of the configurations, and other modifications can be made. In addition, the present invention is not limited to the above-described embodiments, and is limited only by the appended claims.

INDUSTRIAL APPLICABILITY

According to the drill of the present invention, the cutting edge strength can be secured by increasing the wedge angle in the cutting edge shoulder portion, and the occurrence of welding in the cutting edge shoulder portion can be prevented. Therefore, it is possible to prevent a possibility that defects may be caused by detachment of the welded object. Furthermore, the cutting quality of the cutting edge shoulder portion is improved. Accordingly, it is possible to suppress a possibility that a burr may appear in penetrating the through-hole when the through-hole is drilled. Therefore, the present invention is industrially applicable.

REFERENCE SIGNS LIST

1: Drill body
2: Shank portion
3: Cutting edge portion
3A: First margin
3B: Second margin
4: Tapered neck portion

14

5: Cutting edge
5A: Thinning cutting edge portion
5B: Main cutting edge portion
5C: Cutting edge shoulder portion
5a to 5c: Honing surface
6: Tip flank
7: Chip discharging flute
8: Rake face
9: Coolant hole
10: Thinning portion
11: Chamfered portion (triangular chamfered portion, square chamfered portion)
12: Belt-shaped chamfered portion
13: Planar chamfered portion
14: Convex curved chamfered portion
O: Axis of drill body 1
T: Drill rotation direction
P: Outer peripheral end of main cutting edge portion 5B
Q: Outer peripheral end of cutting edge shoulder portion 5C
θB: True rake angle of main cutting edge portion 5B in outer peripheral end P
θC: True rake angle of cutting edge shoulder portion 5C in outer peripheral end Q
D: Diameter of cutting edge 5
L: Straight line connecting cutting edge 5 and axis O in cross section orthogonal to cutting edge 5 in outer peripheral end P
M: Straight line connecting cutting edge 5 and axis O in cross section orthogonal to cutting edge 5 in outer peripheral end Q
N1: Straight line connecting axis O and outer peripheral end Q of cutting edge shoulder portion 5C when viewed from tip side in direction of axis O
N2: Straight line connecting axis O and outer peripheral end P of main cutting edge portion 5B when viewed from tip side in direction of axis O
H: Size of honing of main cutting edge portion 5B (width of honing surface 5b in direction of straight line L)
R: Size of honing of cutting edge shoulder portion 5C (radius of honing surface 5c in cross section orthogonal to cutting edge 5)
W: Width of cutting edge shoulder portion 5C in direction of straight line N1

What is claimed is:

1. A drill in which a tip outer peripheral portion of a drill body rotated around an axis in a drill rotation direction has a chip discharging flute which is open in a tip flank of the drill body and extends to a rear end side in a direction of the axis, and an intersection ridgeline portion between a wall surface of the chip discharging flute facing the drill rotation direction and the tip flank has a cutting edge having the wall surface as a rake face, wherein the cutting edge includes a main cutting edge portion extending from an inner peripheral side toward an outer peripheral side of the drill body, and a cutting edge shoulder portion extending from an outer peripheral end of the main cutting edge portion to an outer periphery of the drill body, and the cutting edge is subjected to honing, compared to the outer peripheral end of the main cutting edge portion, in an outer peripheral end of the cutting edge shoulder portion, a true rake angle which is an inclination angle of the rake face with respect to a straight line connecting the cutting edge and the axis in a cross section orthogonal to the cutting edge is increased on a negative rake angle side, and a size of the honing subjected to the cutting edge shoulder portion decreases, a belt-shaped chamfered portion intersecting at an obtuse angle with the wall surface on an inner peripheral side from the outer peripheral edge portion is formed along the chip discharging flute in the outer peripheral edge portion of the wall surface of the chip discharging flute which faces the drill rotation direction, and the cutting edge shoulder portion is formed in the intersection ridgeline portion between the belt-shaped chamfered portion and the tip flank.

2. The drill according to claim 1, wherein a width of the cutting edge shoulder portion in an extending direction of a straight line connecting the axis and the outer peripheral end of the cutting edge shoulder portion when viewed from a tip side in the direction of the axis is equal to or smaller than 0.2×D, compared to a diameter D of the cutting edge.

3. The drill according to claim 1, wherein a size of the honing of the cutting edge shoulder portion is equal to or smaller than 0.8×H, compared to a size H of the honing of the main cutting edge portion.

4. The drill according to claim 1, wherein the honing applied to the main cutting edge portion is chamfer honing, and the honing applied to the cutting edge shoulder portion is round honing.

5. A drill in which a tip outer peripheral portion of a drill body rotated around an axis in a drill rotation direction has a chip discharging flute which is open in a tip flank of the drill body and extends to a rear end side in a direction of the axis, and an intersection ridgeline portion between a wall surface of the chip discharging flute facing the drill rotation direction and the tip flank has a cutting edge having the wall surface as a rake face, wherein the cutting edge includes a main cutting edge portion extending from an inner peripheral side toward an outer peripheral side of the drill body, and a cutting edge shoulder portion extending from an outer peripheral end of the main cutting edge portion to an outer periphery of the drill body, and the cutting edge is subjected to honing, compared to the outer peripheral end of the main cutting edge portion, in an outer peripheral end of the cutting edge shoulder portion, a true rake angle which is an inclination angle of the rake face with respect to a straight line connecting the cutting edge and the axis in a cross section orthogonal to the cutting edge is increased on a negative rake angle side, and a size of the honing subjected to the cutting edge shoulder portion decreases, a convex curved chamfered portion coming into contact with the tip flank on an inner peripheral side from the outer peripheral portion and the outer peripheral surface of the drill body extending from the rake face to a side opposite to the drill rotation direction is formed in the outer peripheral portion of the tip flank, and the cutting edge shoulder portion is formed in the intersection ridgeline portion between the convex curved chamfered portion and the rake face.

6. The drill according to claim 5, wherein a width of the cutting edge shoulder portion in an extending direction of a straight line connecting the axis and the outer peripheral end of the cutting edge shoulder portion when viewed from a tip side in the direction of the axis is equal to or smaller than 0.2×D, compared to a diameter D of the cutting edge.

7. The drill according to claim 5, wherein a size of the honing of the cutting edge shoulder portion is equal to or smaller than 0.8×H, compared to a size H of the honing of the main cutting edge portion.

8. The drill according to claim 5, wherein the honing applied to the main cutting edge portion is chamfer honing, and the honing applied to the cutting edge shoulder portion is round honing.

* * * * *